US012297884B2

(12) United States Patent
Kelly

(10) Patent No.: US 12,297,884 B2
(45) Date of Patent: May 13, 2025

(54) IMPACT ABSORBING APPARATUS

(71) Applicant: James Kelly, Denver, CO (US)

(72) Inventor: James Kelly, Denver, CO (US)

( * ) Notice: Subject to any disclaimer, the term of this patent is extended or adjusted under 35 U.S.C. 154(b) by 0 days.

(21) Appl. No.: 17/681,027

(22) Filed: Feb. 25, 2022

(65) Prior Publication Data

US 2022/0178419 A1 Jun. 9, 2022

Related U.S. Application Data

(63) Continuation-in-part of application No. 16/729,777, filed on Dec. 30, 2019, now abandoned, which is a continuation of application No. 15/858,353, filed on Dec. 29, 2017, now Pat. No. 10,520,056.

(60) Provisional application No. 62/440,521, filed on Dec. 30, 2016, provisional application No. 62/440,529, filed on Dec. 30, 2016.

(51) Int. Cl.
*F16F 13/10* (2006.01)
*A42B 3/12* (2006.01)
*F16F 3/087* (2006.01)
*F16F 9/04* (2006.01)
*A63B 71/08* (2006.01)
*A63B 71/10* (2006.01)

(52) U.S. Cl.
CPC .............. *F16F 13/10* (2013.01); *A42B 3/122* (2013.01); *A42B 3/124* (2013.01); *F16F 3/087* (2013.01); *F16F 9/04* (2013.01); *F16F 13/105* (2013.01); *A63B 71/08* (2013.01); *A63B 71/10* (2013.01); *A63B 2209/02* (2013.01); *F16F 2224/025* (2013.01)

(58) Field of Classification Search
CPC .. F16F 3/087; F16F 3/122; F16F 3/124; F16F 9/04; F16F 13/10; F16F 13/105; F16F 2224/025; A63B 2209/02; A63B 71/10
See application file for complete search history.

(56) References Cited

U.S. PATENT DOCUMENTS

| | | | | |
|---|---|---|---|---|
| 2,664,567 A | 1/1954 | Nichols | | |
| 3,245,428 A | * 4/1966 | Klimak | ................. | F16L 37/256 137/493 |
| 3,679,159 A | 7/1972 | Bach et al. | | |
| 3,713,640 A | 1/1973 | Margan | | |
| 4,038,700 A | 8/1977 | Gyory | | |
| 4,375,108 A | 3/1983 | Gooding | | |
| 4,566,137 A | 1/1986 | Gooding | | |
| 4,762,308 A | 8/1988 | Geno | | |
| 7,089,602 B2 | * 8/2006 | Talluri | ................... | A42B 3/063 2/412 |

(Continued)

*Primary Examiner* — Vishal R Sahni
(74) *Attorney, Agent, or Firm* — SHORE IP GROUP, PLLC; Sean R. Wilsusen

(57) ABSTRACT

An impact absorbing apparatus includes a first chamber including a first chamber wall and a first valve disposed in the first chamber wall. The impact absorbing apparatus includes a second chamber including a second chamber wall and a second valve disposed in the second chamber wall. A plurality of connecting pillars connects the first chamber to the second chamber. The plurality of connecting pillars is configured to shift position in response to a first impact. The first valve is configured to pass air in and out of the first chamber. The second valve is configured to pass air in and out of the second chamber.

19 Claims, 20 Drawing Sheets

(56) References Cited

U.S. PATENT DOCUMENTS

| | | | |
|---|---|---|---|
| 8,128,165 B2* | 3/2012 | Marsden | B60N 2/286 297/216.13 |
| 8,863,320 B2* | 10/2014 | Kelly | A42B 3/121 2/413 |
| 9,328,833 B2* | 5/2016 | Ostrander | F16K 17/02 |
| 2007/0190293 A1 | 8/2007 | Ferrara | |
| 2008/0256686 A1 | 10/2008 | Ferrara | |
| 2010/0295341 A1* | 11/2010 | Marsden | B60N 2/2884 297/216.11 |
| 2011/0005629 A1* | 1/2011 | Ostrander | F16K 17/02 137/849 |
| 2011/0171420 A1* | 7/2011 | Yang | A41D 13/0156 428/116 |
| 2014/0021890 A1 | 1/2014 | Herrera | |
| 2015/0033454 A1 | 2/2015 | Kelly et al. | |

* cited by examiner

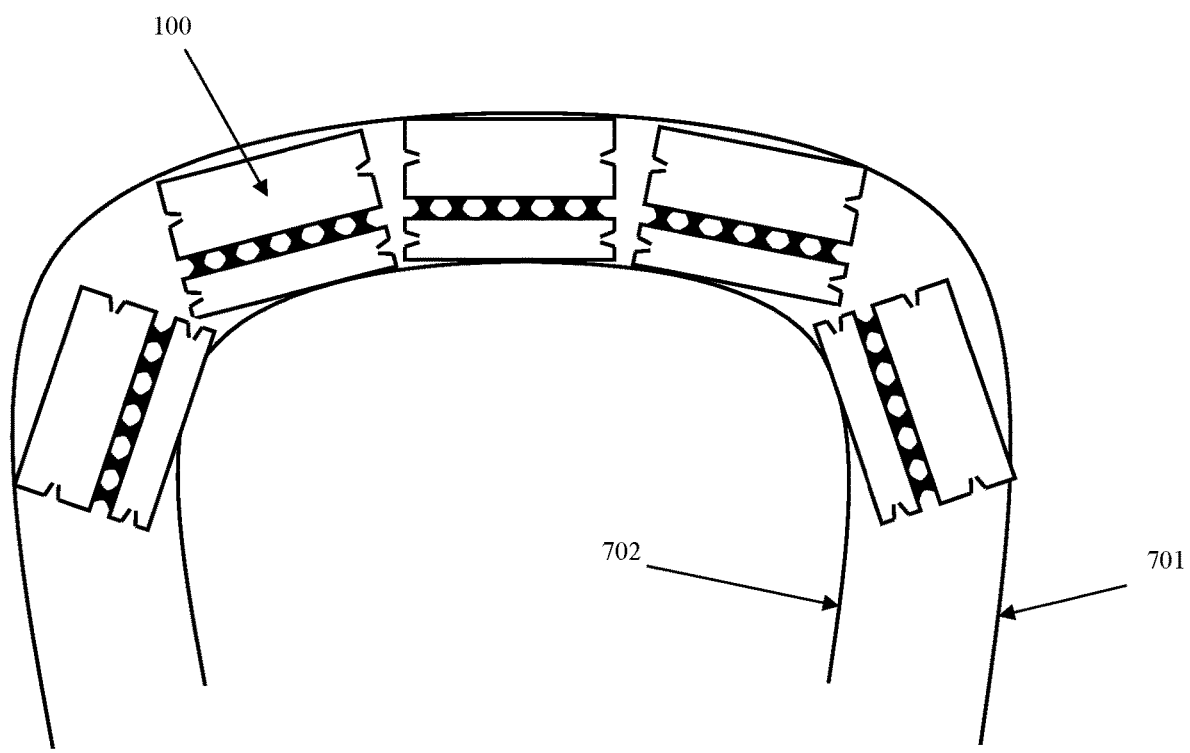

IMPACT ABSORBING APPARATUS

CROSS-REFERENCE TO RELATED APPLICATIONS

The present application is a continuation in part of U.S. patent application Ser. No. 16/729,777, filed on Dec. 30, 2019, which is a continuation of U.S. patent application Ser. No. 15/858,353, filed on Dec. 29, 2017, which claims priority to U.S. Provisional Patent Application No. 62/440,521, filed on Dec. 30, 2016 and U.S. Provisional Patent Application No. 62/440,529, filed on Dec. 30, 2016, the entire contents of which are incorporated by reference herein.

TECHNICAL FIELD

The present disclosure relates to an impact absorbing apparatus. More particularly, exemplary embodiments of the present disclosure relate to an impact absorbing apparatus usable in a helmet or safety equipment.

SUMMARY

An exemplary embodiment of the present disclosure provides an impact absorbing apparatus includes a first chamber including a first chamber wall and a first valve disposed in the first chamber wall. The first valve is configured to pass air out of the first chamber at a first rate when the first valve is in a closed state. The first valve is configured to pass air into the first chamber at a second rate when the first chamber is in an open state. The second rate is faster than the first rate. The impact absorbing apparatus includes a second chamber including a second chamber wall and a second valve disposed in the second chamber wall. The second valve is configured to pass air out of the second chamber at a third rate when the second valve is in a closed state. The second valve is configured to pass air into the second chamber at a fourth rate when the second valve is in an open state. The fourth rate is faster than the third rate. A plurality of connecting pillars connects the first chamber to the second chamber. The plurality of connecting pillars is configured to shift position in response to a first impact. The first valve is configured to pass air out of the first chamber at the first rate in response to a second impact. The second valve is configured to pass air out of the second chamber at the third rate in response to a third impact.

According to an exemplary embodiment of the present disclosure, the first valve may include a plurality of first valve leaflets. Each of the first valve leaflets may include an outer wall connected to the first chamber wall, first and second side walls projecting away from the first chamber wall, and a curved inner wall opposite the outer wall. The curved inner walls of the first valve leaflets may form a first aperture configured to pass air out of the first chamber at the first rate when the first valve is in a closed position.

According to an exemplary embodiment of the present disclosure, the second valve may include a plurality of second valve leaflets. Each of the second valve leaflets may include an outer wall connected to the second chamber wall, first and second side walls projecting away from the second chamber wall, and a curved inner wall opposite the outer wall. The curved inner walls of the second valve leaflets may form a second aperture configured to pass air out of the second chamber at the third rate when the second valve is in a closed position.

According to an exemplary embodiment of the present disclosure, the second impact may be greater than the first impact.

According to an exemplary embodiment of the present disclosure, the third impact may be greater than the second impact.

According to an exemplary embodiment of the present disclosure, the second rate may be substantially equal to the fourth rate.

According to an exemplary embodiment of the present disclosure, the first valve leaflets may form an obtuse angle of less than 180° with the first chamber wall when the first valve leaflets are in a closed state. According to an exemplary embodiment of the present disclosure, the obtuse angle may be from about 120° to about 160°.

According to an exemplary embodiment of the present disclosure, the second valve leaflets may form an obtuse angle of less than 180° with the second chamber wall when the second valve leaflets are in a closed state. According to an exemplary embodiment of the present disclosure, the obtuse angle may be from about 120° to about 160°.

According to an exemplary embodiment of the present disclosure, the first valve leaflets may form an obtuse angle of less than 130° with the first chamber wall when the first valve leaflets are in an open state. The obtuse angle may be from about 100° to about 120°.

According to an exemplary embodiment of the present disclosure, the second valve leaflets may form an obtuse angle of less than 130° with the second chamber wall when the second valve leaflets are in an open state. The obtuse angle may be from about 100° to about 120°.

According to an exemplary embodiment of the present disclosure, at least one first chamber reinstating pillar may be disposed in the first chamber. The first chamber reinstating pillar may be configured to apply a first force to return a compressed first chamber to its original shape.

According to an exemplary embodiment of the present disclosure, the impact absorbing apparatus may include at least one second chamber reinstating pillar disposed in the second chamber. The second chamber reinstating pillar may be configured to apply a second force to return a compressed second chamber to its original shape.

According to an exemplary embodiment of the present disclosure, the first force may be smaller than the second force.

According to an exemplary embodiment of the present disclosure, the at least one first chamber reinstating pillar may be configured to at least partially compress in response to the second impact to decrease an acceleration of the second impact.

According to an exemplary embodiment of the present disclosure, the at least one second chamber reinstating pillar may be configured to at least partially compress in response to the third impact to decrease an acceleration of the second impact.

According to an exemplary embodiment of the present disclosure, the connecting pillars may decrease a first acceleration caused by the first impact. The first valve may decrease a second acceleration caused by the second impact. The second valve may decrease a third acceleration caused by the third impact.

An exemplary embodiment of the present disclosure provides a valve for an impact absorbing apparatus including a plurality of valve leaflets. Each of the valve leaflets includes an outer wall connected to a chamber wall, first and second side walls projecting away from the chamber wall, and a curved inner wall opposite the outer wall. A first side wall of a first valve leaflet of the plurality of valve leaflets may be in direct contact with a second side wall of a second adjacent valve leaflet of the plurality of valve leaflets when the plurality of valve leaflets are in a closed state. When the plurality of valve leaflets is in the closed state, the curved inner walls of the valve leaflets of the plurality of valve leaflets form a first aperture configured to regulate air flow through the first aperture. When the plurality of valve leaflets is in an open state, the curved inner walls of the valve leaflets of the plurality of valve leaflets are separated from each other and form a second aperture larger than the first aperture.

According to an exemplary embodiment of the present disclosure, the first aperture may be configured to pass air therethrough at a higher rate than the second aperture.

According to an exemplary embodiment of the present disclosure, the first aperture may have a substantially circular shape.

According to an exemplary embodiment of the present disclosure, a diameter of the first aperture may be in a range of from about 1 mm to about 20 mm.

According to an exemplary embodiment of the present disclosure, each of the outer walls of the plurality of valve leaflets may have a curved shape, and the outer walls may form a substantially circular outermost valve diameter.

According to an exemplary embodiment of the present disclosure, the first aperture may be configured to controllably decompress a chamber in which the plurality of valve leaflets is disposed.

According to an exemplary embodiment of the present disclosure, the first aperture may pass air bi-directionally.

According to an exemplary embodiment of the present disclosure, each of the plurality of valve leaflets may form an obtuse angle of less than 180° with the chamber wall when the plurality of valve leaflets is in the closed state.

According to an exemplary embodiment of the present disclosure, the obtuse angle may be from about 120° to about 160°.

According to an exemplary embodiment of the present disclosure, each of the plurality of valve leaflets may form an obtuse angle of less than 130° with the chamber wall when the plurality of valve leaflets is in the closed state. The obtuse angle may be from about 100° to about 120°.

According to an exemplary embodiment of the present disclosure, a plurality of connecting pillars extend between the chamber ceiling of the first chamber and the chamber floor of the second chamber. The plurality of connecting pillars connect the first chamber to the second chamber. The plurality of connecting pillars are configured to shift position in response to a first impact. The plurality of connecting pillars each define a first end extending below the ceiling of the first chamber and a second end extending above the floor of the second chamber.

According to an exemplary embodiment of the present disclosure, a stabilization disk is arranged between the first chamber and the second chamber. The stabilization disk connects the plurality of connecting pillars to each other.

According to an exemplary embodiment of the present disclosure, the first inner space of the first chamber extends to a first inner space of a first connecting pillar of the plurality of connecting pillars. The second inner space of the second chamber extends to a second inner space of the first connecting pillar of the plurality of connecting pillars.

According to an exemplary embodiment of the present disclosure, the inner space of the first chamber has a different volume from a volume of the inner space of the second chamber. The first end of each of the plurality of connecting pillars extends into the first chamber a different distance than the second end of each of the plurality of connecting pillars extends into the second chamber.

According to an exemplary embodiment of the present disclosure, a second plurality of connecting pillars are arranged in the first inner space of the first chamber and a third plurality of connecting pillars are arranged in the second inner space of the second chamber.

According to an exemplary embodiment of the present disclosure, the third plurality of connecting pillar are stacked on the plurality of connecting pillars. The plurality of connecting pillars are stacked on the second plurality of connecting pillars. A first stabilization disk connects the plurality of connecting pillars to each other between the first chamber and the second chamber.

According to an exemplary embodiment of the present disclosure, a second stabilization disk connects the second plurality of connecting pillars to each other in the first inner space of the first chamber. A third stabilization disk connects the third plurality of connecting pillars to each other in the second inner space of the second chamber.

According to an exemplary embodiment of the present disclosure, the plurality of connecting pillars each have a tapered configuration along a direction extending between the first chamber and the second chamber.

According to an exemplary embodiment of the present disclosure, the plurality of connecting pillars each define a first end portion, a second end portion and a central portion between the first end portion and the second end portion. The central portion defines a wider width than a width of the first end portion or the second end portion.

According to an exemplary embodiment of the present disclosure, each of the plurality of connecting pillars defines a third inner space and a fourth inner space. The third inner space and the fourth inner space are each fluidly isolated from the first inner space of the first chamber and the second inner space of the second chamber.

BRIEF DESCRIPTION OF THE FIGURES

The above and other features of the present disclosure will become more apparent by describing in detail exemplary embodiments thereof, with reference to the accompanying drawings, in which:

FIG. 7 illustrates a helmet including a plurality of impact absorbing apparatuses according to an exemplary embodiment of the present disclosure.

DETAILED DESCRIPTION

Figure 1A:
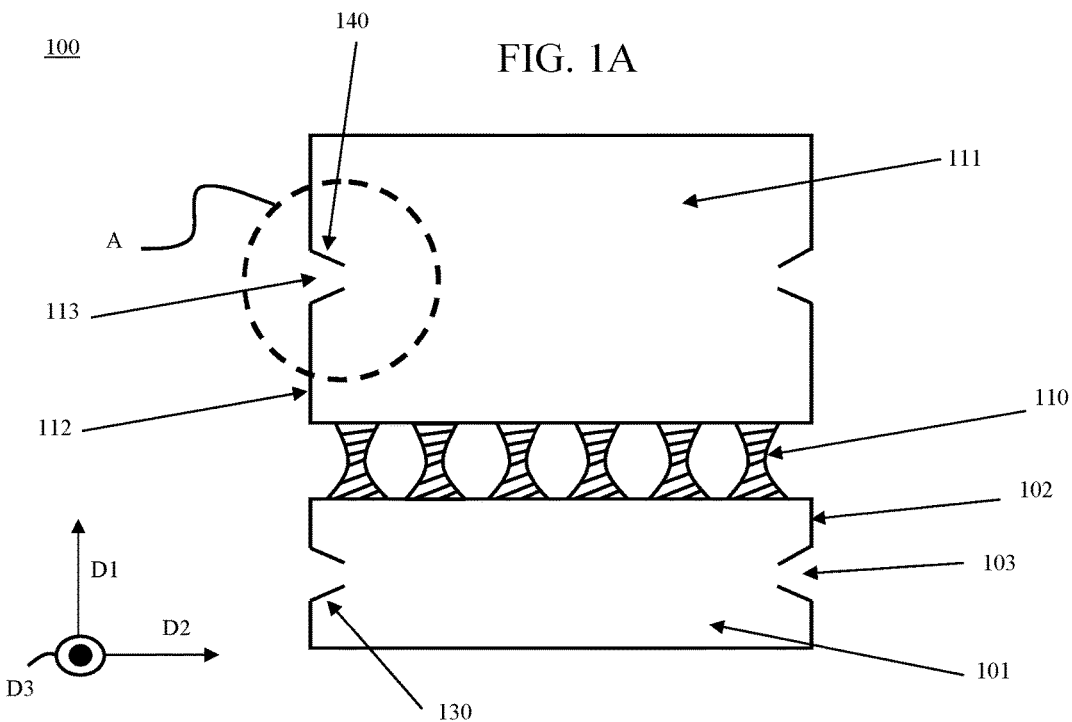
FIG. 1A is a cross-sectional view of an impact absorbing apparatus according to an exemplary embodiment of the present disclosure.

A concussion is a type of traumatic brain injury that may result from a hit to the head or body, a fall, or another injury that jars or shakes the brain inside the skull. The brain is an unattached organ inside the skull and is separated from the inside of the skull by a relatively thin layer of cerebrospinal fluid. The brain is a relatively delicate organ and a sudden movement, impact, or a sufficient acceleration can result in the brain sliding back and forth or rotating within the skull, which can cause damage to various superficial and relatively deep anatomical regions of the brain.

Acceleration is a change in velocity over a period of time. A substantial force (e.g., resulting from a rapid acceleration), even in the absence of direct and visible impact to the head, can cause a concussion. For example, trauma can occur as a result of a rapid change in the head's velocity or change in vector speed over time. Thus, by reducing a rate of acceleration (e.g., by spreading absorption of an impact over a longer period of time) by using an impact absorbing apparatus, a rate of occurrence and severity of concussions may be substantially mitigated or eliminated. For example, research has shown that reducing linear and/or rotational acceleration of the head can reduce a degree of maximal stress or strain applied to both superficial and relatively deep anatomical regions of the brain.

Exemplary embodiments of the present disclosure provide an impact absorbing apparatus configured to reduce negative health consequences, such as concussion, traumatic brain injury (TBI) and Chronic Traumatic Encephalopathy (CTE) resulting from a rapid acceleration or an impact to the head, such as may occur in ice hockey, football and cycling. The impact absorbing apparatus may be used in a safety helmet or other safety gear, such as sports padding or a sports helmet.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary embodiments of the present disclosure will be described more fully hereinafter with reference to the accompanying drawings. Like reference numerals may refer to like elements throughout the specification and drawings.

FIGS. 1A, 1B, 1C, 2A, 2B, 2C, 3, 4A, 4B, 5, 6A, 6B, 9A, 9B and 9C each include a compass indicating a first direction D1, a second direction D2 and a third direction D3. In each of FIGS. 1A, 1B, 1C, 2A, 2B, 2C, 3, 4A, 4B, 5, 6A, 6B, 9A, 9B and 9C, one of the first, second and third directions D1, D2 and D3 indicates an up or down direction, a second of the first, second and third directions D1, D2 and D3 indicates a right or left direction, and a third of the first, second and third directions D1, D2 and D3 indicates a direction into or out of the plane of the page.

Figure 1B:
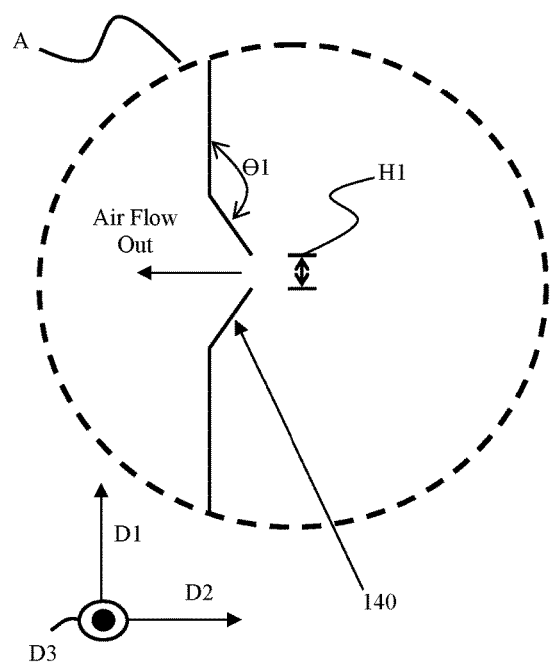
FIG. 1B illustrates an expanded view of area "A" of FIG. 1A when a valve is in a closed state according to an exemplary embodiment of the present disclosure.
Figure 1C:
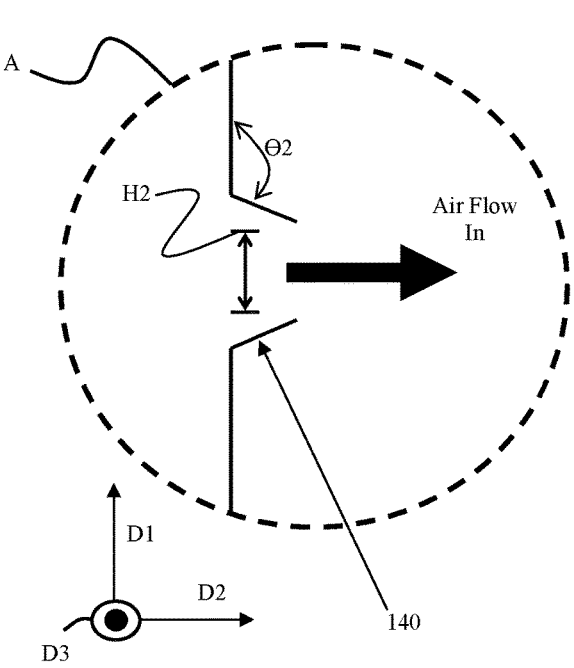
FIG. 1C illustrates an expanded view of area "A" of FIG. 1A when a valve is in an open state according to an exemplary embodiment of the present disclosure.

FIG. 1A is a cross-sectional view of an impact absorbing apparatus according to an exemplary embodiment of the present disclosure. FIG. 1B illustrates an expanded view of area "A" of FIG. 1A when a valve is in a closed state according to an exemplary embodiment of the present disclosure. FIG. 1C illustrates an expanded view of area "A" of FIG. 1A when a valve is in an open state according to an exemplary embodiment of the present disclosure.

Figure 4A:
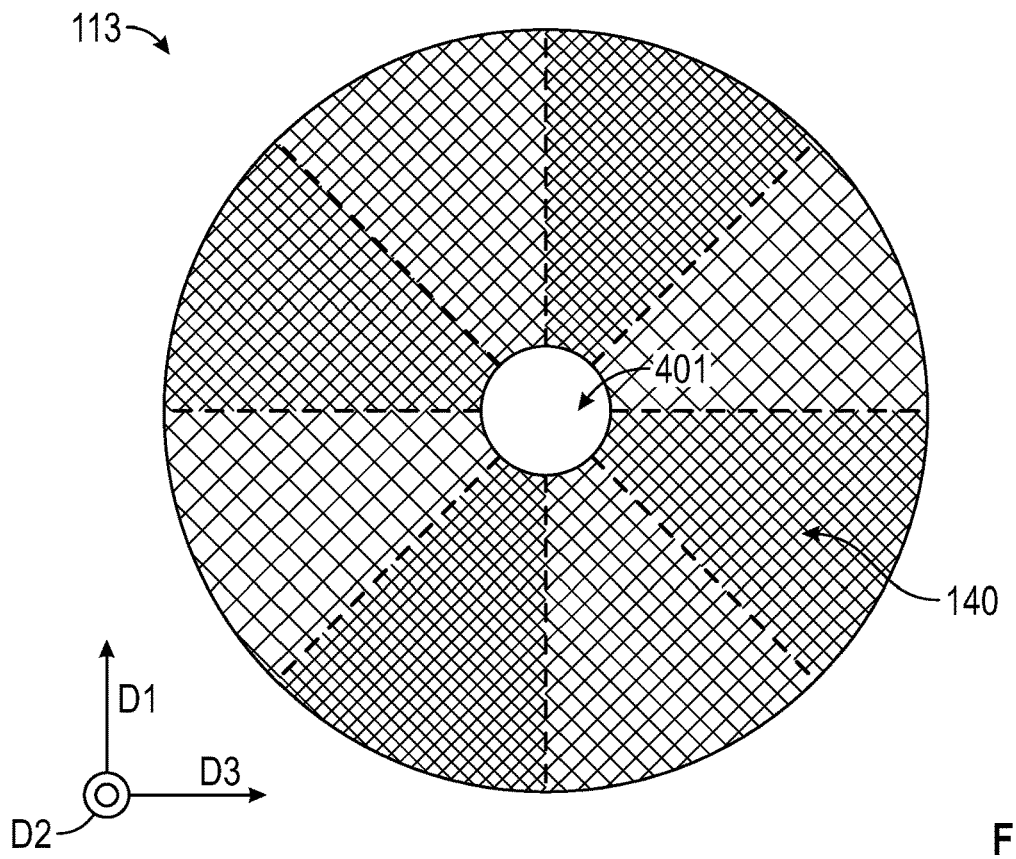
FIG. 4A illustrates a view into a valve in a closed state along a second direction according to an exemplary embodiment of the present disclosure.
Figure 4B:
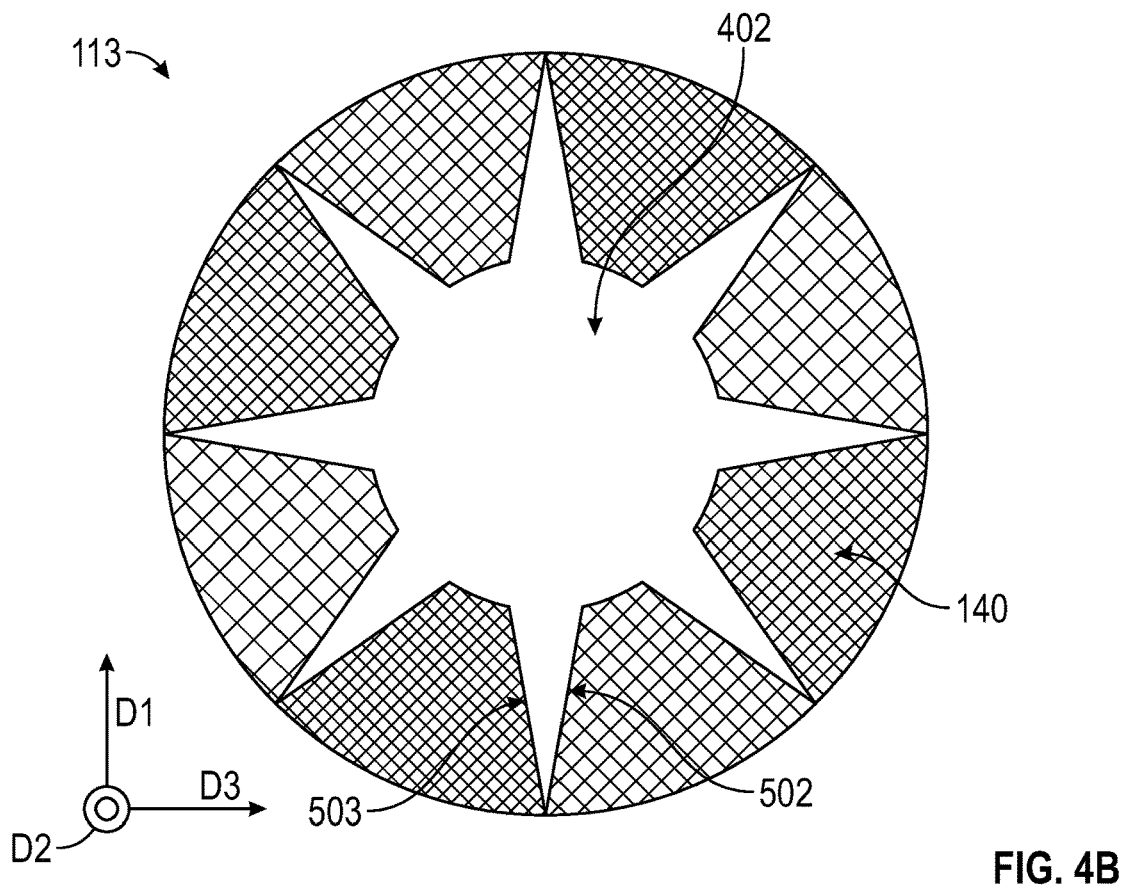
FIG. 4B illustrates a view into a valve in an open state along a second direction according to an exemplary embodiment of the present disclosure.

Referring to FIGS. 1A, 1B and 1C, an exemplary embodiment of the present disclosure provides an impact absorbing apparatus 100 including a first chamber 101 having a first chamber wall 102 and a first valve 103 disposed in the first chamber wall 102. The first valve 103 is configured to pass air out of the first chamber 101 at a first rate when the first valve 103 is in a closed state (see, e.g., FIG. 4A illustrating a valve in a closed state). The first valve 103 is configured to pass air into the first chamber 101 at a second rate when the first chamber 101 is in an open state (see, e.g., FIG. 4B illustrating a valve in an open state). The second rate is faster than the first rate. The impact absorbing apparatus 100 includes a second chamber 111 having a second chamber wall 112 and a second valve 113 disposed in the second chamber wall 112. The second valve 113 is configured to pass air out of the second chamber 111 at a third rate when the second valve 113 is in a closed state. The second valve 113 is configured to pass air into the second chamber 111 at a fourth rate when the second valve 113 is in an open state. The fourth rate is faster than the third rate. A plurality of connecting pillars 110 connects the first chamber 101 to the second chamber 111. The plurality of connecting pillars 110 is configured to shift position in response to a first impact. The first valve 103 is configured to pass air out of the first chamber 101 at the first rate in response to a second impact. The second valve 113 is configured to pass air out of the second chamber 111 at the third rate in response to a third impact.

According to an exemplary embodiment of the present disclosure, the second impact described above may be greater than the first impact, and the third impact described above may be greater than the second impact. According to an exemplary embodiment of the present disclosure, the second rate may be substantially equal to the fourth rate. Compression of the connecting pillars 110, the first chamber 101 and the second chamber 111 in response to the first impact, the second impact and the third impact, respectively, will be described in more detail below with reference, for example, to FIG. 3.

The first valve 103 may have substantially a same configuration as the second valve 113, with the exception of sizes of first and second air exit apertures 401 formed by the first valve 103 and the second valve 113 and/or sizes of first and second air entrance apertures 402 formed by the first valve 103 and the second valve 113. Aperture sizes are discussed in more detail below with reference, for example, to FIGS. 4A and 4B. Generally, with the exception of possibly having different aperture sizes, a description of one of the first valve 103 or the second valve 113 herein may similarly apply to the other of the first valve 103 or the second valve 113 according to exemplary embodiments of the present disclosure.

According to an exemplary embodiment of the present disclosure, the first chamber 101 and/or the second chamber 111 may be returned to their original shape relatively rapidly after being compressed due to an impact. For example, the first chamber 101 and/or the second chamber 111 may be returned to their original shape within about 100 ms to about 1,500 ms (e.g., within 100-500 ms). A relatively large aperture size formed by the first valve 103 and/or the second valve 104 in an open state, as discussed below in more detail, may allow air to flow back into the first chamber 101 and/or the second chamber 111, respectively, in a substantially unobstructed manner, and thus reinstating an original shape of the first chamber 101 and/or the second chamber 111 may occur relatively rapidly. As an example, the chamber wall 102 of the first chamber 101 and/or the chamber wall 112 of the second chamber 111 may each include at least one polymer (e.g., an elastomer) configured to relatively rapidly return to its original shape.

An elastomer refers to a natural or synthetic polymer having elastic properties. Elastomers may display viscoelasticity (e.g., may have both viscosity and elasticity), and may have relatively weak inter-molecular forces. Elastomers may have a relatively low Young's modulus. A rapidly expanding elastomer configured to rapidly reinstate its original shape may have relatively high elastic properties. An elastomer included in the chamber wall 102 of the first chamber 101 and/or the chamber wall 112 of the second chamber 111 may be selected based on a desired rate of return to the elastomers original shape. Non-limiting examples of elastomers may include Natural polyisoprene: cis-1,4-polyisoprene natural rubber (NR) and trans-1,4-polyisoprene gutta-percha; Synthetic polyisoprene (IR for isoprene rubber); Polybutadiene (BR for butadiene rubber); or Chloroprene rubber (CR).

Figure 2A:
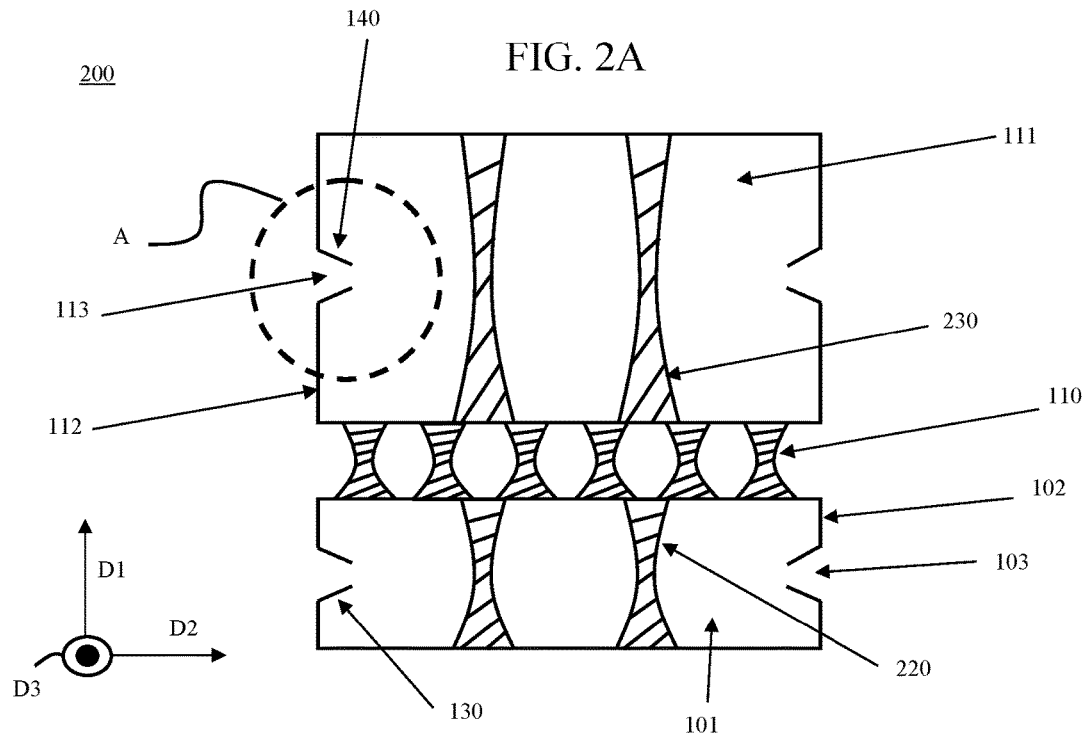
FIG. 2A is a cross-sectional view of an impact absorbing apparatus according to an exemplary embodiment of the present disclosure.
Figure 2B:
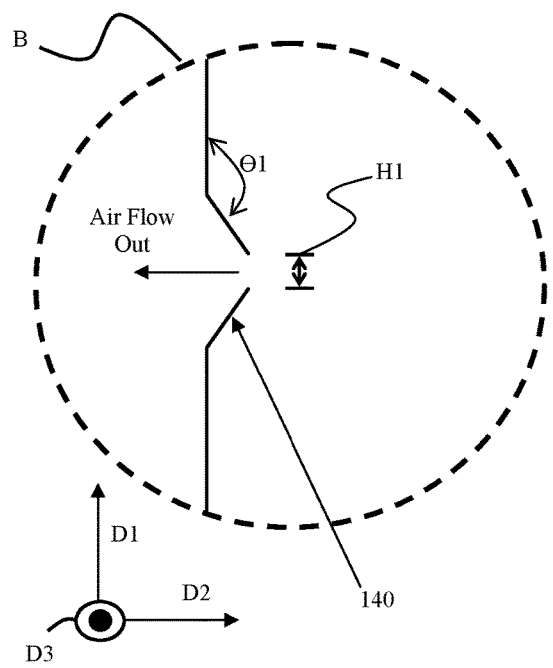
FIG. 2B illustrates an expanded view of area "B" of FIG. 2A when a valve is in a closed state according to an exemplary embodiment of the present disclosure.
Figure 2C:
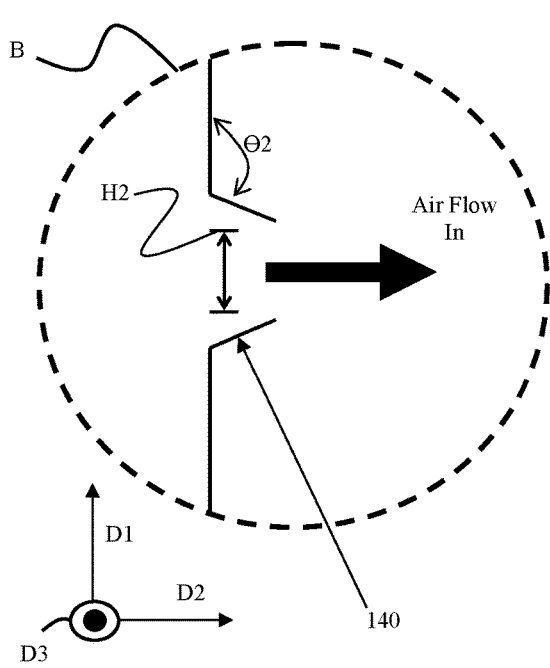
FIG. 2C illustrates an expanded view of area "B" of FIG. 2A when a valve is in an open state according to an exemplary embodiment of the present disclosure.

FIG. 2A is a cross-sectional view of an impact absorbing apparatus according to an exemplary embodiment of the present disclosure. FIG. 2B illustrates an expanded view of area "B" of FIG. 2A when a valve is in a closed state according to an exemplary embodiment of the present disclosure. FIG. 2C illustrates an expanded view of area "B" of FIG. 2A when a valve is in an open state according to an exemplary embodiment of the present disclosure.

An impact absorbing apparatus 200 described with reference to FIG. 2A, FIG. 2B and FIG. 2C, for example, may be substantially the same as the impact absorbing apparatus 100, with the exception of a first chamber reinstating pillar 220 and/or a second chamber reinstating pillar 230. Thus, features described with reference to the impact absorbing apparatus 100 may similarly be included in the impact absorbing apparatus 200, and duplicative descriptions may be omitted.

Referring to FIG. 2A, FIG. 2B and FIG. 2C, according to an exemplary embodiment of the present disclosure, at least one first chamber reinstating pillar 220 may be disposed in the first chamber 101. The first chamber reinstating pillar 220 may be configured to apply a first force to return a compressed first chamber 101 to its original shape.

According to an exemplary embodiment of the present disclosure, the impact absorbing apparatus 200 may include at least one second chamber reinstating pillar 230 disposed in the second chamber 111. The second chamber reinstating pillar 230 may be configured to apply a second force to return a compressed second chamber 111 to its original shape.

According to an exemplary embodiment of the present disclosure, the first force applied to the first chamber 101 may be smaller than the second force applied to the second chamber 111.

A number of chamber reinstating pillars according to an exemplary embodiment of the present disclosure is not limited to a particular number of pillars, and the number of pillars may be adjusted, as desired. For example, additional chamber reinstating pillars may be included in a larger chamber, or to increase a rate at which an original shape of a particular chamber is reinstated.

According to an exemplary embodiment of the present disclosure, the first chamber 101 and/or the second chamber 111 may be returned to their original shape relatively rapidly after being compressed due to an impact. For example, the first chamber 101 and/or the second chamber 111 may be returned to their original shape within about 100 ms to about 1,500 ms (e.g., within 100-500 ms). A relatively large aperture size formed by the first valve 103 and/or the second valve 104 in an open state, as discussed below in more detail, may allow air to flow back into the first chamber 101 and/or the second chamber 111, respectively, in a substantially unobstructed manner, and thus reinstating an original shape of the first chamber 101 and/or the second chamber 111 may occur relatively rapidly. As an example, the at least one first chamber reinstating pillar 220 and/or the at least one second chamber reinstating pillar 230 may each apply a force to the first chamber 101 and/or the second chamber 111, respectively, which may increase a rate at which an original shape of the first chamber 101 and/or the second chamber 111 is reinstated.

According to an exemplary embodiment of the present disclosure, the at least one first chamber reinstating pillar 220 may be configured to at least partially compress in response to the second impact to decrease an acceleration of the second impact.

According to an exemplary embodiment of the present disclosure, the at least one second chamber reinstating pillar 230 may be configured to at least partially compress in response to the third impact to decrease an acceleration of the second impact.

As an example, the at least one first chamber reinstating pillar 220 and/or the at least one second chamber reinstating pillar 230 may each include at least one polymer (e.g., an elastomer) configured to relatively rapidly return to its original shape and/or to apply a force to the chamber wall 102 of the first chamber 101 and/or the chamber wall 112 of the second chamber 111, respectively.

An elastomer refers to a natural or synthetic polymer having elastic properties. Elastomers may display viscoelasticity (e.g., may have both viscosity and elasticity), and may have relatively weak inter-molecular forces. Elastomers may have a relatively low Young's modulus. A rapidly expanding elastomer configured to rapidly reinstate its original shape may have relatively high elastic properties. An elastomer included in the at least one first chamber reinstating pillar 220 and/or the at least one second chamber reinstating pillar 230 may be selected based on a desired rate of return to the elastomers original shape. Non-limiting examples of elastomers may include Natural polyisoprene: cis-1,4-polyisoprene natural rubber (NR) and trans-1,4-polyisoprene guttapercha; Synthetic polyisoprene (IR for isoprene rubber); Polybutadiene (BR for butadiene rubber); or Chloroprene rubber (CR).

Figure 5:
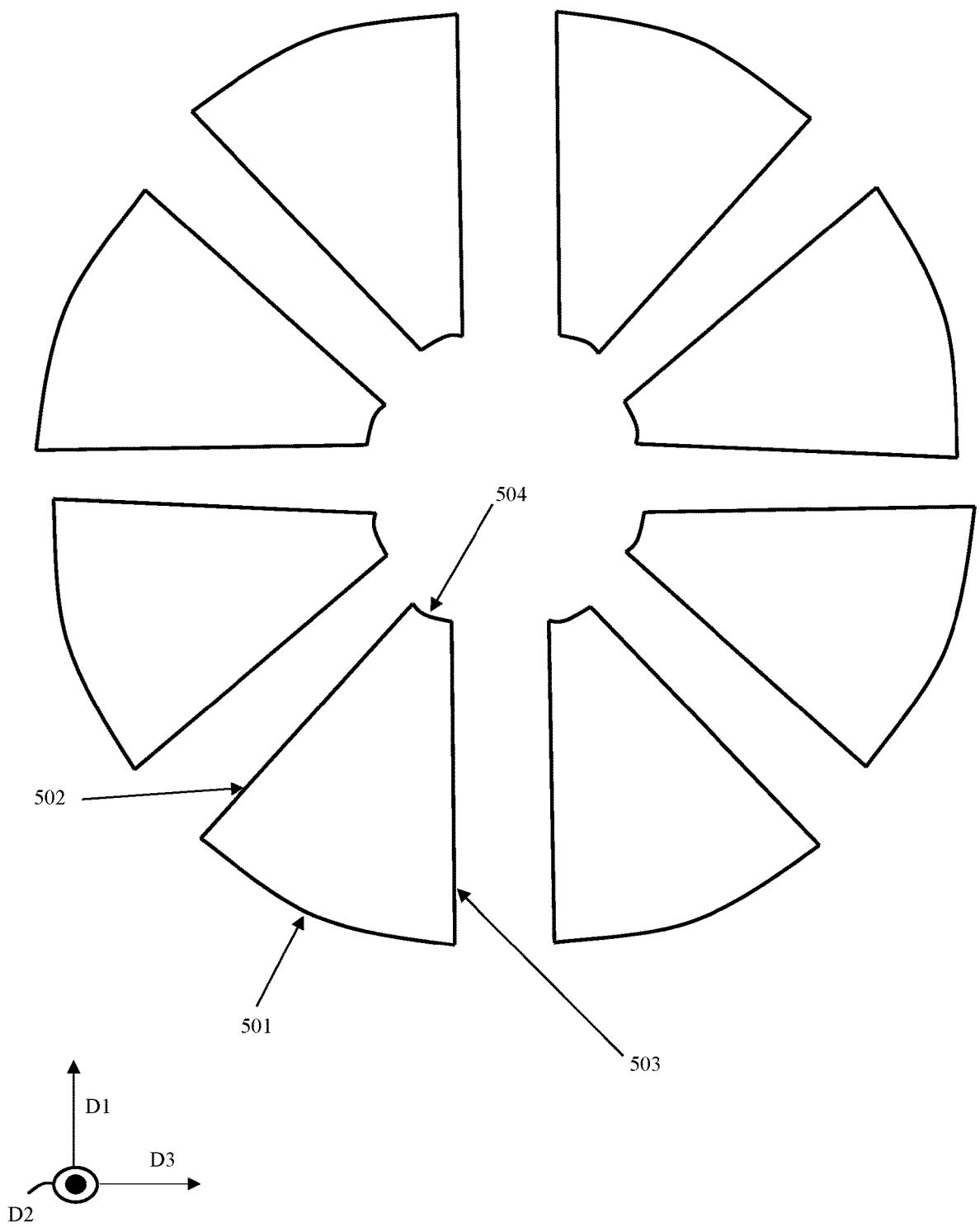
FIG. 5 illustrates an exploded view of a plurality of valve leaflets of a valve according to an exemplary embodiment of the present disclosure.

FIG. 4A illustrates a view into a valve in a closed state along a second direction according to an exemplary embodiment of the present disclosure. FIG. 4B illustrates a view into a valve in an open state along a second direction according to an exemplary embodiment of the present disclosure. FIG. 5 illustrates an exploded view of a plurality of valve leaflets of a valve according to an exemplary embodiment of the present disclosure.

Referring to FIG. 1A, FIG. 1B, FIG. 1C, FIG. 4A, FIG. 4B and FIG. 5, according to an exemplary embodiment of the present disclosure, the first valve 103 may include a plurality of first valve leaflets 130. Each of the first valve leaflets 130 may include an outer wall 501 connected to the first chamber wall 102, first and second side walls 502 and 503 projecting away from the first chamber wall 102, and a curved inner wall 504 opposite the outer wall 501. The curved inner walls 504 of the first valve leaflets 130 may form a first air exit aperture 401 configured to pass air out of the first chamber 101 at the first rate when the first valve 103 is in a closed state.

According to an exemplary embodiment of the present disclosure, the second valve 113 may include a plurality of second valve leaflets 140. Each of the second valve leaflets 140 may include the outer wall 501 connected to the second chamber wall 112, first and second side walls 502 and 503 projecting away from the second chamber wall 112, and the curved inner wall 504 opposite the outer wall. The curved inner walls 504 of the second valve leaflets 140 may form a second air exit aperture 401 configured to pass air out of the second chamber 111 at the third rate when the second valve 113 is in a closed state.

The first valve 103 (including the first valve leaflets 130) may have substantially a same configuration as the second valve 113 (including the second valve leaflets 140), with the exception of sizes of first and second air exit apertures 401 formed by the first valve 103 and the second valve 113, respectively; and/or sizes of first and second air entrance apertures 402 formed by the first valve 103 and the second valve 113, respectively. Thus, an opening and closing of only the second valve 113 will be described in more detail below regarding the formation of the air exit aperture 401 and the air entrance aperture 402. However, the first valve 103 will be understood to open and close in substantially the same way as the second valve 113 to form a corresponding air exit aperture 401 and air entrance aperture 402 of the first valve 103.

According to an exemplary embodiment of the present disclosure, each of the valve leaflets (e.g., the second valve leaflets 140) may form a first obtuse angle (e.g., e1) with the chamber wall (e.g., the second chamber wall 112) when the impact absorbing apparatus (e.g., the impact absorbing apparatus 100) is in an inflated state, and has not recently experienced an impact. That is, the valve (e.g., the second valve 113) may be in the closed state (e.g., may have a first diameter H1—see, e.g., FIG. 1B, FIG. 2B and FIG. 4A) when the impact absorbing apparatus has not experienced a recent impact and the valve leaflets may project slightly away from the chamber wall toward an inside of the chamber while being positioned to form the air exit aperture 401. The air exit aperture 401 is formed by the curved inner walls 504 of the plurality of valve leaflets when the valve is in the closed state. That is, even in the closed state, the air exit aperture 401 will controllably allow air to exit the chamber in response to an impact, while controlling the rate at which the air exits the chamber. A diameter of the air exit aperture 401 may be adjusted to increase or decrease a flow rate of air exiting the chamber. In the closed state, side walls of each of the valve leaflets may be in direct contact with each other and may create an airtight seal, with the exception of the air exit aperture 401. One or more impacts to the impact absorbing apparatus may then apply a force to an outside of the impact absorbing apparatus, which may cause air to be forced through the exit aperture 401 at a desired flow rate to absorb an impact, reduce a rate of acceleration and therefore reduce an amount of force applied to an object in contact with the impact absorbing apparatus.

During the impact to the impact absorbing apparatus, the chamber may compress and an area inside the chamber may become smaller as air exits the chamber through the air exit aperture 401. A material (e.g., an elastomer) included in the chamber wall may cause the chamber to relatively rapidly return to its original shape when the impact is over, thus pulling air back into the chamber to refill the chamber. The air returning into the chamber may pass through the air entrance aperture 402, which may cause the valve to expand into the open state (see, e.g., FIG. 1C, FIG. 2C and FIG. 4B). The open valve may have a second diameter (e.g., a second diameter 112 which is larger than the first diameter H1). The open valve may form a second obtuse angle (e.g., $\ominus 2$) that is smaller than the first obtuse angle (e.g., $\ominus 1$) with respect to the side wall of the chamber. Thus, air may be pulled back into the chamber relatively rapidly and the chamber may return to its original shape (e.g., within about 100 ms to about 1,500 ms).

According to an exemplary embodiment of the present disclosure, the connecting pillars 110 may decrease a first acceleration caused by the first impact. The first valve 101 may decrease a second acceleration caused by the second impact. The second valve 111 may decrease a third acceleration caused by the third impact.

According to an exemplary embodiment of the present disclosure, the valve (e.g., the second valve 113) may form an obtuse angle with the chamber wall (e.g., the second chamber wall 112) and may face into the chamber. The obtuse angle may allow the air exit aperture 401 to sustain substantial air exit pressure without bending toward an outside of the chamber, and without being forced to expand beyond a desired size of the air exit aperture 401.

According to an exemplary embodiment of the present disclosure, the first valve leaflets 130 may form an obtuse angle of less than 180° with an inside of the first chamber wall 102 when the first valve leaflets 130 are in a closed state. According to an exemplary embodiment of the present disclosure, the obtuse angle may be from about 120° to about 160°.

According to an exemplary embodiment of the present disclosure, the second valve leaflets 140 may form an obtuse angle of less than 180° with an inside of the second chamber wall 112 when the second valve leaflets 140 are in a closed state. According to an exemplary embodiment of the present disclosure, the obtuse angle may be from about 120° to about 160°.

According to an exemplary embodiment of the present disclosure, the first valve leaflets 130 may form an obtuse angle of less than 130° with an inside of the first chamber wall 102 when the first valve leaflets 130 are in an open state. The obtuse angle may be from about 100° to about 120°.

According to an exemplary embodiment of the present disclosure, the second valve leaflets 140 may form an obtuse angle of less than 130° with an inside of the second chamber wall 112 when the second valve leaflets 140 are in an open state. The obtuse angle may be from about 100° to about 120°.

According to an exemplary embodiment of the present disclosure, a diameter of the air exit aperture 401 may be in a range of from about 1 mm to about 20 mm. However, exemplary embodiments of the present disclosure are not limited thereto, and other diameters may be employed, as desired.

According to an exemplary embodiment of the present disclosure, the first chamber 101 may have a different internal volume, (e.g., may have a different size) than the second chamber 111. Thus, an amount of air in the first and second chambers 101 and 111 may be different from each other.

The air exit aperture 401 of the first valve 103 may have a same or a different diameter than the air exit aperture 401 of the second valve 113. The air entrance aperture 402 of the first valve 103 may have a same or a different diameter than the air entrance aperture 402 of the second valve 113. As an example, the air exit aperture 401 of the first valve 103 may have a different diameter than the air exit aperture 401 of the second valve 113, which may allow air to exit the first and second chambers 101 and 111 at different rates, respectively. Thus, a compression rate of the first and second chambers 101 and 111 may be different from each other.

As an example, the air exit aperture 401 of the first valve 103 may have a different diameter than the air exit aperture 401 of the second valve 113, while the air entrance apertures 403 of each of the first and second chambers 101 and 111 may be substantially the same as each other. Thus, each of the first and second chambers 101 and 111 may be configured to absorb a different level of impact, while refill rates of each of the first and second chambers 101 and 111 may be substantially the same as each other.

As an example, the air exit aperture 401 of the first valve 103 may have substantially a same diameter as the air exit aperture 401 of the second valve 113, and the air entrance apertures 403 of each of the first and second chambers 101 and 111 may be substantially the same as each other. Thus, an air exit rate of each of the first and second chambers 101 and 111 may be substantially the same as each other, and refill rates of each of the first and second chambers 101 and 111 may be substantially the same as each other.

As an example, the air exit aperture 401 of the first valve 103 may have a different diameter than the air exit aperture 401 of the second valve 113, and the air entrance apertures 403 of each of the first and second chambers 101 and 111 may be different from each other. Thus, an air exit rate and an air entrance rate between the first and second chambers 101 and 111 may be different from each other.

As an example, the air exit aperture 401 of the first valve 103 may have substantially a same diameter as the air exit aperture 401 of the second valve 113, while the air entrance apertures 403 of each of the first and second chambers 101 and 111 may be different from each other.

According to an exemplary embodiment of the present disclosure, the volumes of the first and second chambers 101 and 111 may be varied, as desired. For example, if the air exit rates of the first and second chambers 101 and 111 are substantially the same as each other, but a volume of air in the chamber is different, than it may take longer for a larger volume of air to exit the relatively larger chamber, which may increase a time period over which an acceleration is absorbed. The amount of air in each chamber, and flow rates in and out of each chamber may be adjusted, as desired to increase or decrease deflation or inflation times of the first and second chambers.

According to an exemplary embodiment of the present disclosure, shapes of the first and second chambers 101 and 111 may vary. For example, the first and second chambers 101 and 111 may each have substantially circular or oval shapes, or may have substantially square or rectangular shapes. However, exemplary embodiments of the present disclosure are not limited thereto, and various shapes may be employed, as desired. For example, shapes of the first and second chambers 101 and 111 may be selected according to a helmet or safety gear in which the impact absorbing apparatus is employed.

Figure 3:
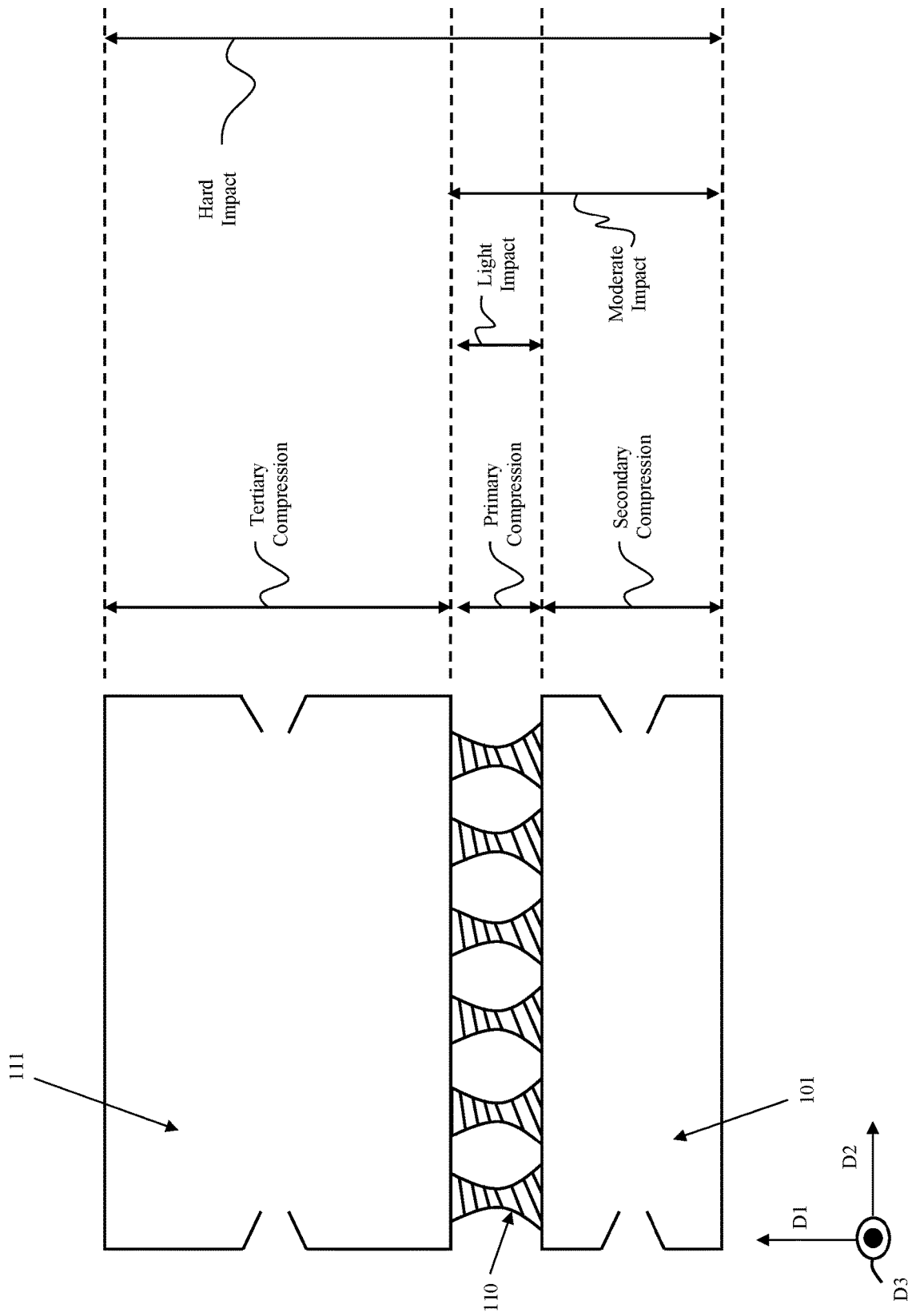
FIG. 3 illustrates light, moderate and hard impact compression of an impact absorbing apparatus according to an exemplary embodiment of the present disclosure.

FIG. 3 illustrates light, moderate and hard impact compression of an impact absorbing apparatus according to an exemplary embodiment of the present disclosure.

According to an exemplary embodiment of the present disclosure, the connecting pillars 110 may compress in response to a relatively light impact, which may decrease a first acceleration caused by the relatively light impact. As an example, the first compression may be a primary compression in which only the connecting pillars 110 compresses, and neither of the first and second chambers 101 and 111 compresses.

According to an exemplary embodiment of the present disclosure, the connecting pillars 110 may be configured to compress along the first direction D1, the second direction D2 and/or the third direction D3. That is, the connecting pillars 110 may shift in any direction. For example, the connecting pillars 110 may allow the first chamber 101 to rotate slightly with respect to the second chamber 111, and/or the connecting pillars may compress along the first direction D1 when the first chamber 101 and/or the second chamber 111 is impacted.

According to an exemplary embodiment of the present disclosure, the connecting pillars 110 and the first chamber 101 may compress in response to a relatively moderate impact, which may decrease a second acceleration caused by the relatively moderate impact. As an example, the second compression may be a secondary compression in which both the connecting pillars 110 and the first chamber 101 are compressed, while the second chamber 111 is not compressed.

According to an exemplary embodiment of the present disclosure, the connecting pillars 110, the first chamber 101 and the second chamber 111 may compress in response to a relatively hard impact, which may decrease a third acceleration caused by the relatively hard impact. As an example, the third compression may be a tertiary compression in which each of the connecting pillars 110, the first chamber 101 and the second chamber 111 are compressed to absorb the relatively hard impact.

As an example, a relatively light impact may refer to an impact of about 3 m/s (approximately 6.7 MPH), a relatively moderate impact may refer to an impact of about 5 m/s (approximately 11.2 MPH) and a relatively hard impact may refer to an impact of about 7 m/s (approximately 15.7 MPH). However, exemplary embodiments of the present disclosure are not limited thereto, and the impact absorbing apparatus may be configured to absorb any desired range of impacts. For example, the impact absorbing apparatus described herein may be configured to absorb a range of intensity of impacts.

As an example, the tertiary compression (e.g., a relatively hard impact) may be an initial impact that occurs without the occurrence of primary or secondary compressions. Thus, only a hard impact might be experienced in the absence of light or moderate impacts.

Figure 6A:
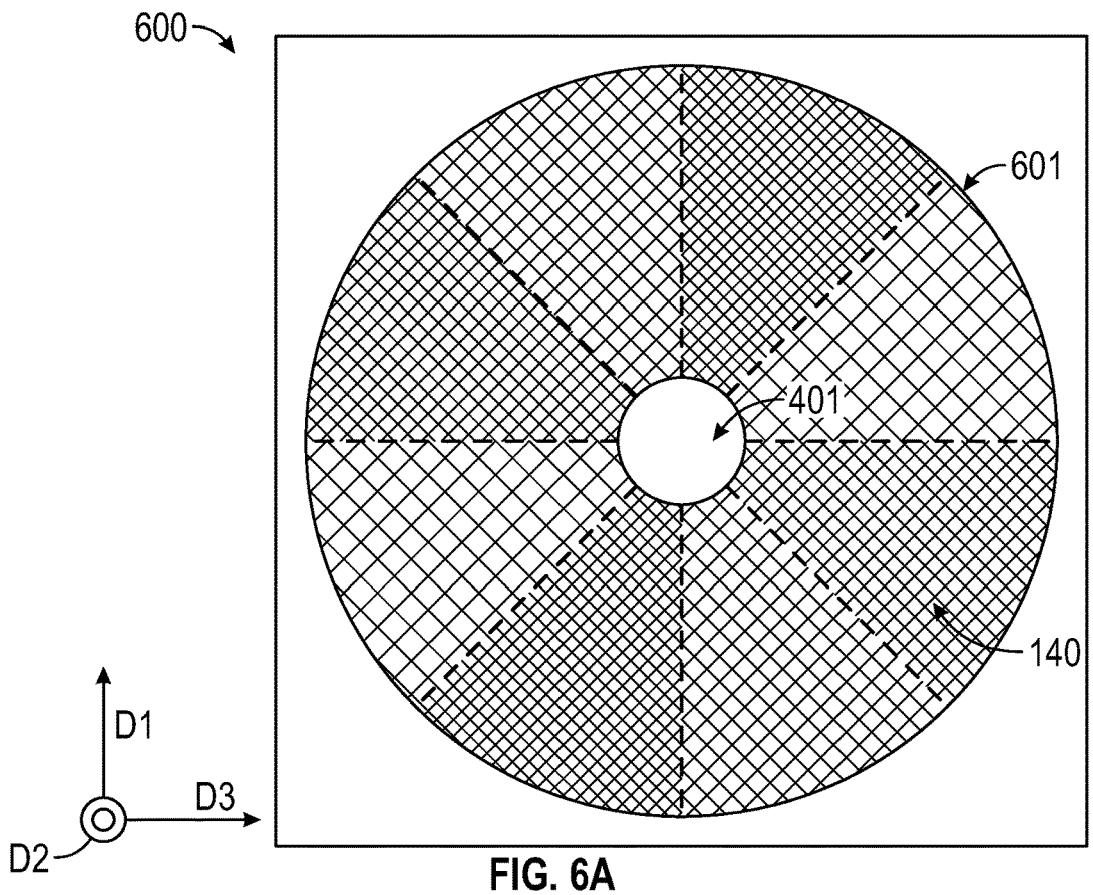
FIG. 6A illustrates a view into a valve in a closed state along a second direction according to an exemplary embodiment of the present disclosure.
Figure 6B:
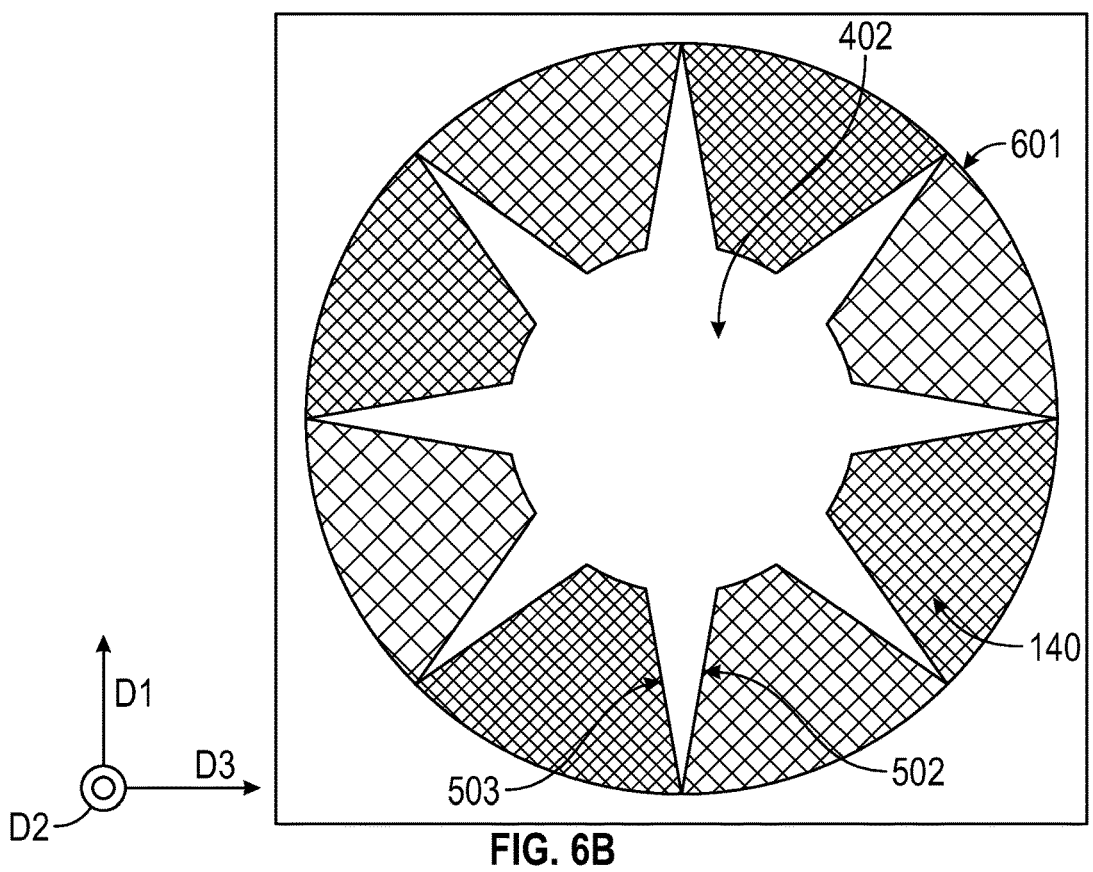
FIG. 6B illustrates a view into a valve in an open state along a second direction according to an exemplary embodiment of the present disclosure.

FIG. 6A illustrates a view into a valve in a closed state along a second direction according to an exemplary embodiment of the present disclosure. FIG. 6B illustrates a view into a valve in an open state along a second direction according to an exemplary embodiment of the present disclosure.

Referring to FIG. 6A and FIG. 6B, an exemplary embodiment of the present disclosure provides a valve 600 for an impact absorbing apparatus including a plurality of valve leaflets 140. Each of the valve leaflets 140 includes the outer wall 501 connected to a valve wall 601, first and second side walls 502 and 503 projecting away from the valve wall 601, and a curved inner wall 504 opposite the outer wall 501. A first side wall of a first valve leaflet of the plurality of valve leaflets may be in direct contact with a second side wall of a second adjacent valve leaflet of the plurality of valve leaflets when the plurality of valve leaflets are in a closed state (see, e.g., FIG. 4A and FIG. 6A illustrating closed valves forming the air exit aperture 401). When the plurality of valve leaflets 140 is in the closed state, the curved inner walls 504 of the valve leaflets of the plurality of valve leaflets 140 form a first aperture (e.g., the air exit aperture 401) configured to regulate air flow through the first aperture. When the plurality of valve leaflets 140 is in an open state, the curved inner walls 504 of the valve leaflets of the plurality of valve leaflets 140 are separated from each other and form a second aperture (e.g., the air entrance aperture 402) larger than the first aperture.

According to an exemplary embodiment of the present disclosure, the first aperture may be configured to pass air therethrough at a slower rate than the second aperture.

According to an exemplary embodiment of the present disclosure, the first aperture may have a substantially circular shape. However, exemplary embodiments of the present disclosure are not limited thereto, and other shapes may be employed, as desired.

According to an exemplary embodiment of the present disclosure, a diameter of the first aperture may be in a range of from about 1 mm to about 20 mm. However, exemplary embodiments of the present disclosure are not limited thereto, and other diameters may be employed, as desired.

According to an exemplary embodiment of the present disclosure, each of the outer walls 501 of the plurality of valve leaflets 140 may have a curved shape, and the outer walls 501 may form a substantially circular outermost valve diameter.

According to an exemplary embodiment of the present disclosure, the first aperture may be configured to controllably decompress a chamber in which the plurality of valve leaflets 140 is disposed, as described in more detail above.

According to an exemplary embodiment of the present disclosure, the first aperture may pass air bi-directionally. For example, air may enter into the chamber through the air exit aperture when the chamber is in an uncompressed state. This may occur, for example, to equilibrate the chamber as a result of changing barometric pressure or changes in altitude.

According to an exemplary embodiment of the present disclosure, each of the plurality of valve leaflets may form an obtuse angle of less than 180° with an inside of the chamber wall when the plurality of valve leaflets is in the closed state. For example, the obtuse angle may be from about 120° to about 160°.

According to an exemplary embodiment of the present disclosure, each of the plurality of valve leaflets may form an obtuse angle of less than 130° with an inside of the chamber wall when the plurality of valve leaflets is in the closed state. The obtuse angle may be from about 100° to about 120°. Thus, a diameter of the air exit aperture 401 may be smaller than a diameter of the air entrance aperture 402.

According to an exemplary embodiment of the present disclosure, the configuration of the valve leaflets allowing air flow in (see, e.g., FIG. 1B) and air flow out (see, e.g., FIG. 1C) may be embodied in two separate valves. For example, a first valve may be dimensioned and shaped, as described herein, to allow air flow in at a first rate, while a second separately positioned valve may be dimensioned and shaped, as described herein, to allow air flow out at a second rate different from the first rate.

According to an exemplary embodiment of the present disclosure, the connecting pillars 110 may be omitted and the first and second chambers 101 and 111 may be in direct contact with each other.

The shape of the connecting pillars 110 as described herein is not limited to a particular shape, and the shape of the connecting pillars 110 may be modified, as desired.

FIG. 7 illustrates a helmet including a plurality of impact absorbing apparatuses according to an exemplary embodiment of the present disclosure.

Referring to FIG. 7, a helmet 700 may include a plurality of impact absorbing apparatuses (e.g., the impact absorbing apparatuses 100). The helmet 700 may be a sports helmet, such as a hockey helmet or a football helmet. The impact absorbing apparatuses may be disposed between an inner helmet wall 702 and an outer helmet wall 701. The outer helmet wall 701 may include a substantially rigid material having a relatively smooth outer surface. The inner helmet wall 702 may include a less rigid material. The inner helmet wall 702 may include a liner configured to contact a user's head and to support the helmet on the user's head.

The plurality of impact absorbing apparatuses may be connected to the inner helmet wall 702 and/or the outer helmet wall 701, or may be wedged between the inner helmet wall 702 and/or the outer helmet wall 701 to hold the plurality of impact absorbing apparatuses in a desired position (e.g., in a position likely to experience an external impact).

The outer helmet wall 701 may include carbon fiber or a carbon fiber blend configured to be relatively light and relatively rigid when exposed to an external impact. The outer helmet wall 701 may additionally include Kevlar.

According to an exemplary embodiment of the present disclosure, the impact absorbing apparatus (e.g., the impact absorbing apparatus 100) may be used in safety padding, such as safety padding for sports equipment. The impact absorbing apparatus may be configured, as described above in more detail, to absorb the degree and severity of impacts experienced by such safety padding. For example, the impact absorbing apparatus may be included in safety gloves or leg padding worn by hockey or football players.

Figure 8A:
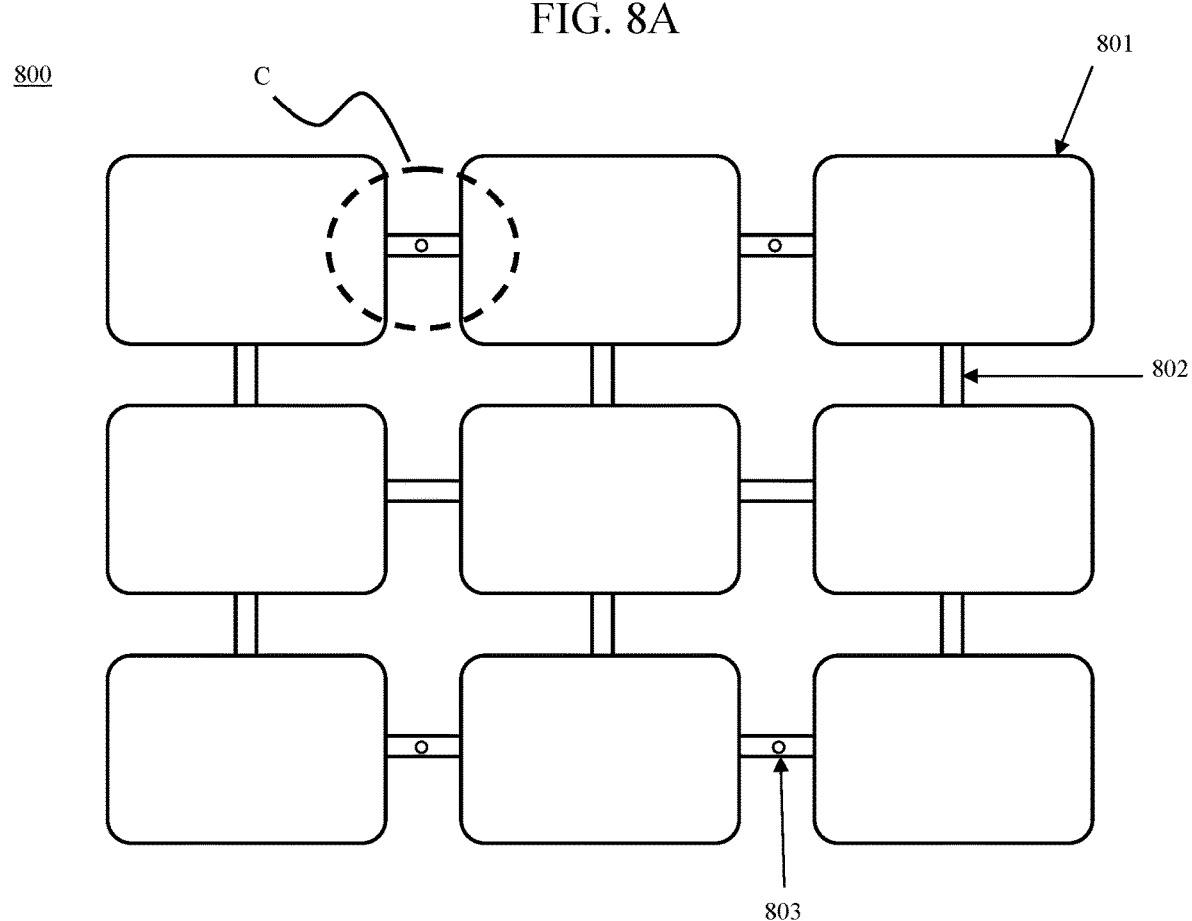
FIG. 8A illustrates an impact absorbing apparatus according to an exemplary embodiment of the present disclosure.
Figure 8B:
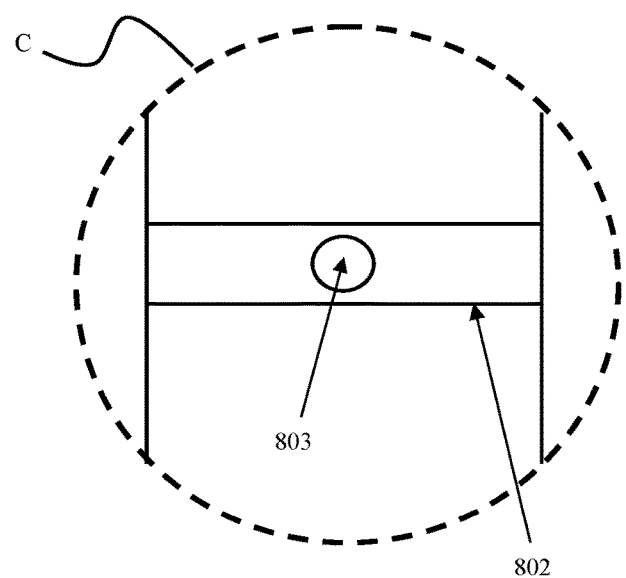
FIG. 8B illustrates an expanded view of area "C" of FIG. 8A according to an exemplary embodiment of the present disclosure.

FIG. 8A illustrates an impact absorbing apparatus according to an exemplary embodiment of the present disclosure. FIG. 8B illustrates an expanded view of area "C" of FIG. 8A according to an exemplary embodiment of the present disclosure.

Referring to FIG. 8A and FIG. 8B, an energy absorbing apparatus 800 may include a plurality of chambers 801. The plurality of chambers 801 may be interconnected to form a closed system having an internal pressure. The closed system may be filled with air or one or more liquids. The interconnected plurality of chambers 801 may be connected to each other by a plurality of connection tubes 802.

Generally, the internal pressure in an air-filled closed system may vary according to a pressure (e.g., a barometric pressure) outside the air-filled system. For example, the pressure outside the air filled system may vary by altitude, and thus the internal pressure may vary as the closed system is positioned at different altitudes. Thus, an impact absorbing capability of the air-filled closed system may vary at different altitudes or at different barometric pressures, or if air unexpectedly exits the closed-system.

In the energy absorbing apparatus 800 according to an exemplary embodiment of the present disclosure, at least one ambient air valve 803 may be disposed in at least one of the plurality of connection tubes 802. While the at least one ambient air valve 803 may be disposed in at least one of the plurality of connection tubes 802, exemplary embodiments of the present disclosure are not limited thereto, and the ambient air valve 803 may be positioned anywhere in the energy absorbing apparatus 800. For example, at least one ambient air valve 803 may be positioned in a side wall of at least one chamber 801.

In the energy absorbing apparatus 800 according to an exemplary embodiment of the present disclosure, each ambient air valve 803 may controllably allow an exchange of ambient air into or out of the impact absorbing apparatus 800. Thus, a desired internal pressure in the impact absorbing apparatus 800 may be maintained by allowing the internal pressure to gradually equilibrate due to air flowing through the at least one ambient air valve 803. While ambient air may flow through at least one ambient air valve 803, the at least one ambient air valve 803 may be dimensioned to pass a relatively slow stream of air so that equilibration occurs relatively slowly.

As an example, the at least one ambient air valve 803 may be a bi-directional valve having a diameter of from about 0.5 mm to 5 mm, for example from about 0.5 mm to about 2 mm. Thus, pressure equilibration may occur without a reduction in the impact absorbing capability of the impact absorbing apparatus 800.

While on impact, air in the chambers 801 will still flow between the plurality of chambers 801 without any air exiting the closed system, ambient air may be able to gradually equilibrate the closed system, or excess internal air may be able to exit the closed system. As an example, the at least one ambient air valve 803 may be configured to not pass air out of the system during an impact to one or more of the chambers 801.

The chambers 801 and the connection tubes 802 may each include one or more polymers (e.g., elastomers), as discussed above in more detail. The at least one ambient air valve 803 may include a plurality of valve leaflets, and may form one or more apertures of different sizes, as discussed above in more detail.

An energy-absorbing apparatus including a closed air-fluid system having a plurality of chambers is described in U.S. Pat. No. 4,375,108 to Gooding, the disclosure of which is incorporated by reference herein in its entirety. An energy-absorbing apparatus including a closed air-fluid system having a plurality of chambers is described in U.S. Pat. No. 4,566,137 to Gooding, the disclosure of which is incorporated by reference herein in its entirety.

Figure 9A:
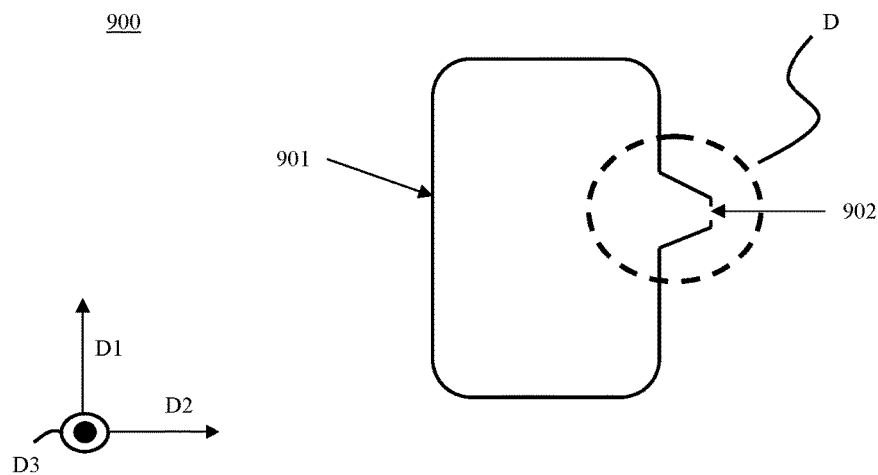
FIG. 9A illustrates an impact absorbing apparatus according to an exemplary embodiment of the present disclosure.
Figures 9B, 9C:
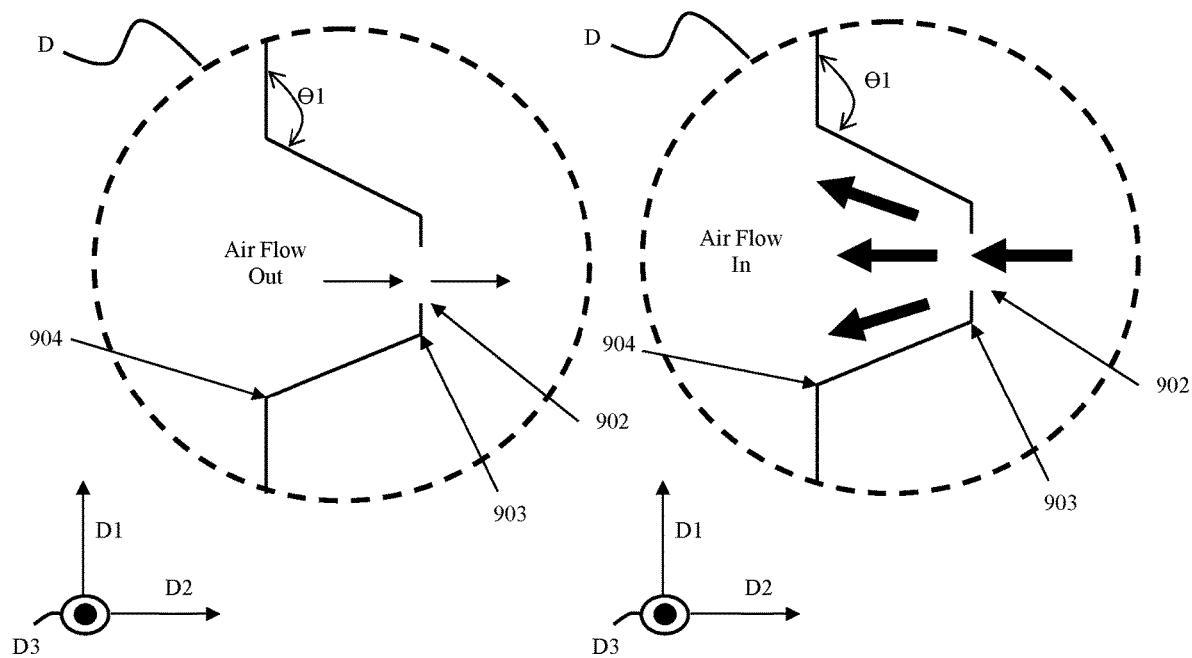
FIG. 9B illustrates an expanded view of area "D" of FIG. 9A according to an exemplary embodiment of the present disclosure.
FIG. 9C illustrates an expanded view of area "D" of FIG. 9A according to an exemplary embodiment of the present disclosure.

FIG. 9A illustrates an impact absorbing apparatus according to an exemplary embodiment of the present disclosure. FIG. 9B illustrates an expanded view of area "D" of FIG. 9A according to an exemplary embodiment of the present disclosure. FIG. 9C illustrates an expanded view of area "D" of FIG. 9A according to an exemplary embodiment of the present disclosure.

Referring to FIG. 9A, FIG. 9B and FIG. 9C, an impact absorbing apparatus 900 may include a chamber 901 and a bi-directional valve 902 disposed in at least one side wall of the chamber 901. The bi-directional valve 902 may include a first end 903 having a first diameter and a second end 904 having a second diameter greater than the first diameter. The bi-directional valve 902 may project away from an inside of the chamber 901.

According to an exemplary embodiment of the present disclosure, the relatively wider diameter of the second end 904 may allow air to flow into the chamber 901 more quickly than air flows out of the chamber 901. Thus, a refill time of the chamber 901 may be shorter than a decompression time.

According to an exemplary embodiment of the present disclosure the bi-directional valve 902 may have a syringe or funnel shape in which the resistance of the outgoing air is greater than the resistance as it returns to refill the impact absorbing apparatus 900. As an example, the compression of the impact absorbing apparatus 900 is relatively slow, while its re-expansion is relatively fast. Impact forces applied to the impact absorbing apparatus 900 are attenuated with a gradual "air bag" effect, but the impact absorbing apparatus 900 is refilled with air relatively quickly following each impact, which may return the impact absorbing apparatus 900 to readiness for additional impacts.

The chamber 901 may include one or more polymers (e.g., elastomers), as discussed above in more detail. The bi-directional valve 902 may include a plurality of valve leaflets, and may form one or more apertures of different sizes, as discussed above in more detail.

Exemplary pillars are described below with reference to FIG. 10-23. Unless otherwise indicated below, the pillars described below may include the same technical features as those described above (e.g., the connecting pillars or chamber reinstating pillars described above), and thus duplicative descriptions may be omitted below. Unless otherwise indicated below components of the impact absorbing apparatus described above (e.g., the first and second chambers and valves) may be the same as in the impact absorbing apparatuses described below and thus duplicative descriptions may be omitted. Generally, the pillar structures described below are configured to absorb lateral or rotational movement of the impact absorbing apparatus, such as rotational force between the first chamber and the second chamber. Thus, safety equipment such as a helmet employing the impact absorbing apparatuses described herein can more effectively absorb a rotational impact.

Figure 10:
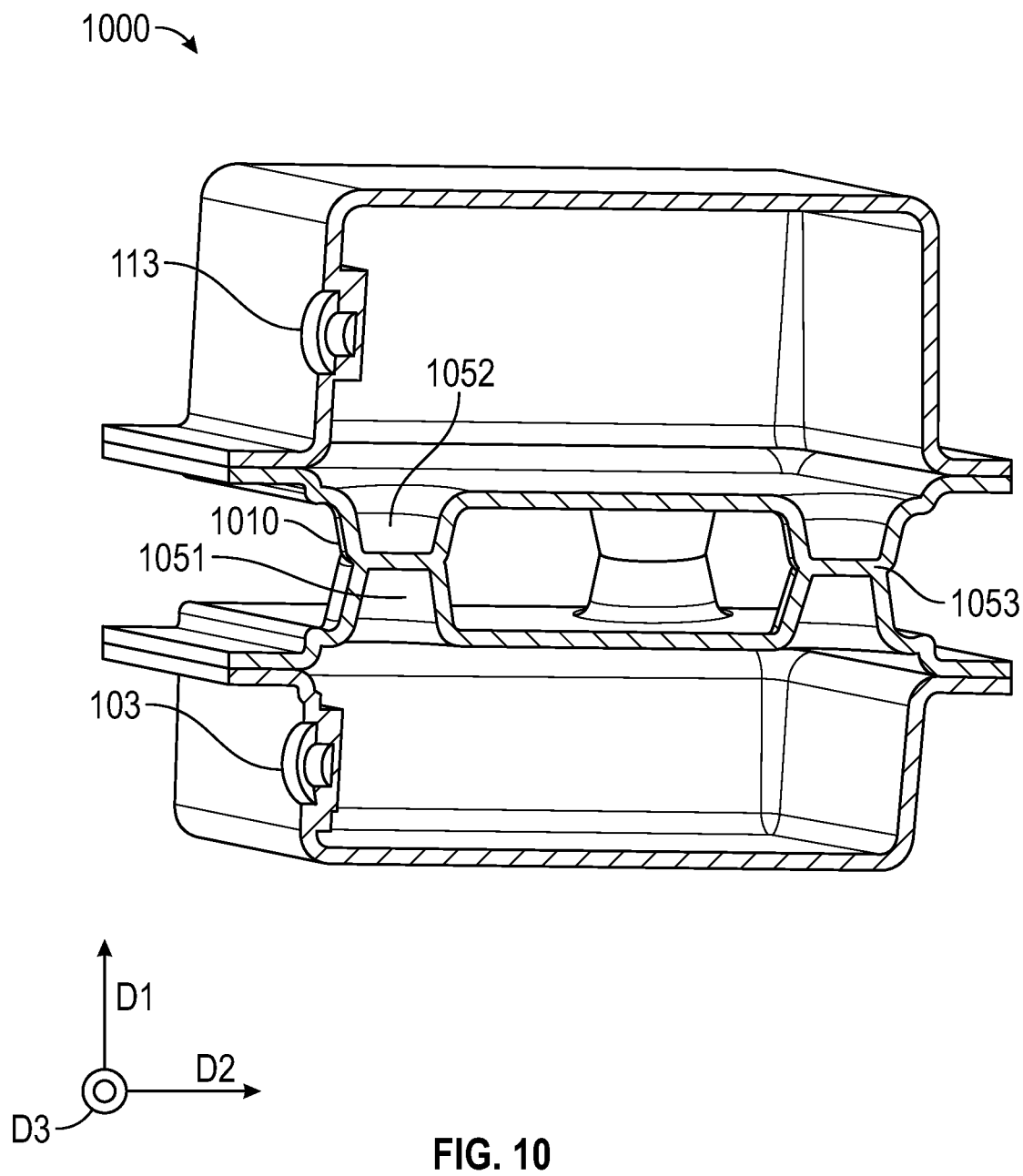
FIG. 10 is a cross-sectional view of another impact absorbing apparatus according to an exemplary embodiment of the present disclosure.

Referring to FIG. 10, in impact absorbing apparatus 1000 the first inner space of the first chamber extends to a first inner space 1051 of a first connecting pillar 1010 of the plurality of connecting pillars. The second inner space of the second chamber extends to a second inner space 1052 of first connecting pillar 1010 of the plurality of connecting pillars. A wall 1053 may separate the first inner space 1051 of the first connecting pillar 1010 from the second inner space 1052 of first connecting pillar 1010.

Figure 11:
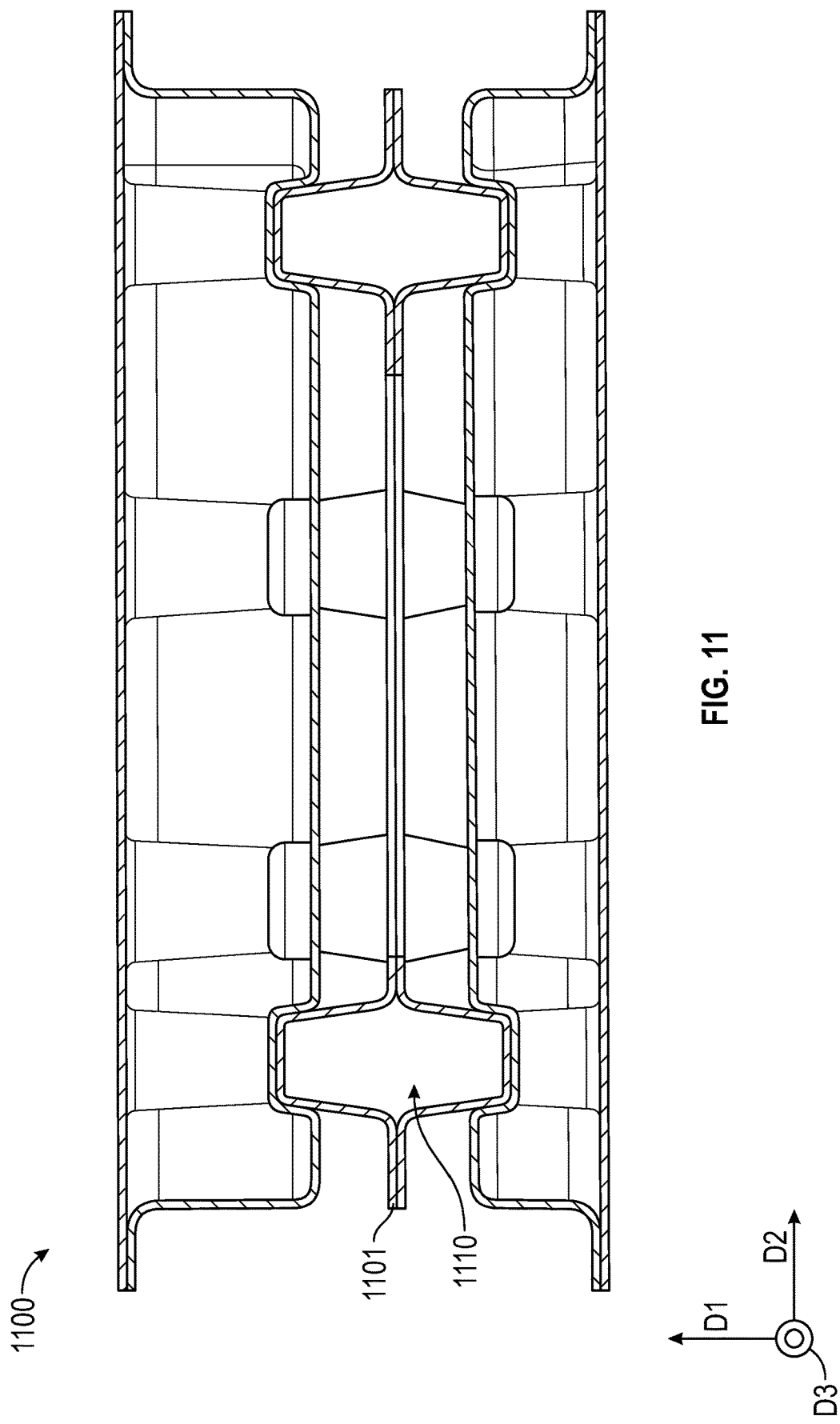
FIG. 11 is a cross-sectional view of an impact absorbing apparatus according to an exemplary embodiment of the present disclosure.
Figure 12:
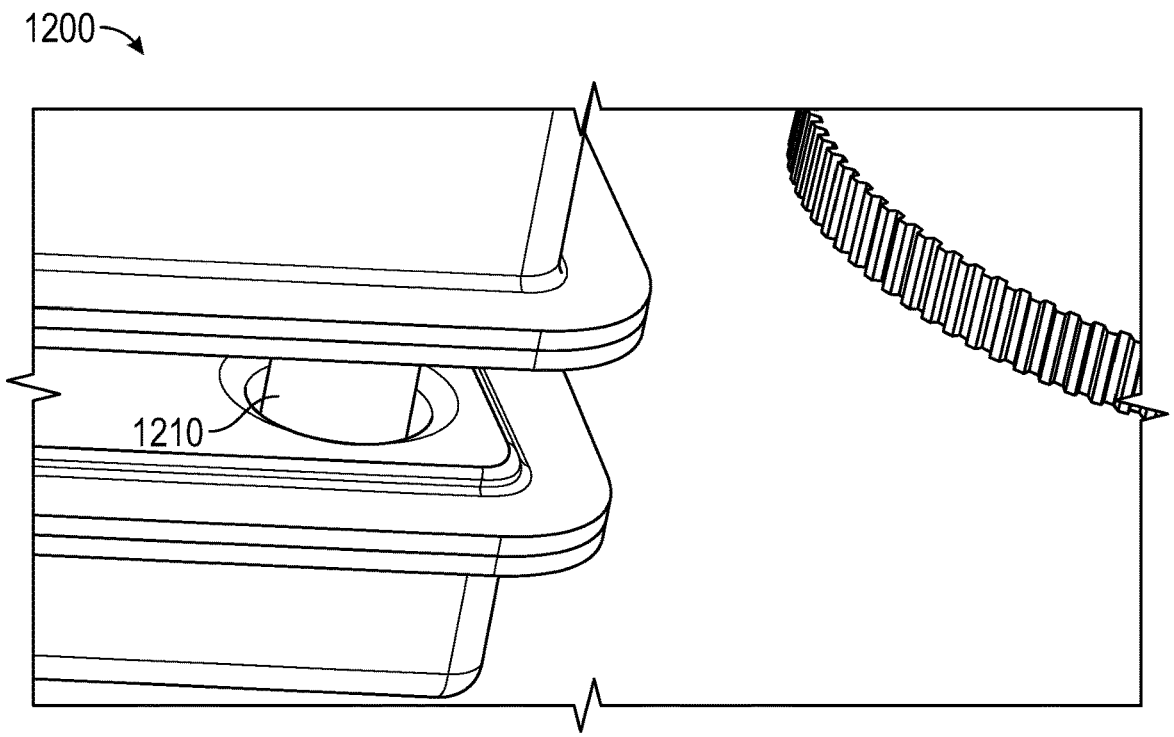
FIG. 12 is an enlarged exterior view of an embedded pillar extending between a first chamber and a second chamber of the impact absorbing apparatus of FIG. 11 according to an exemplary embodiment of the present disclosure.
Figure 13:
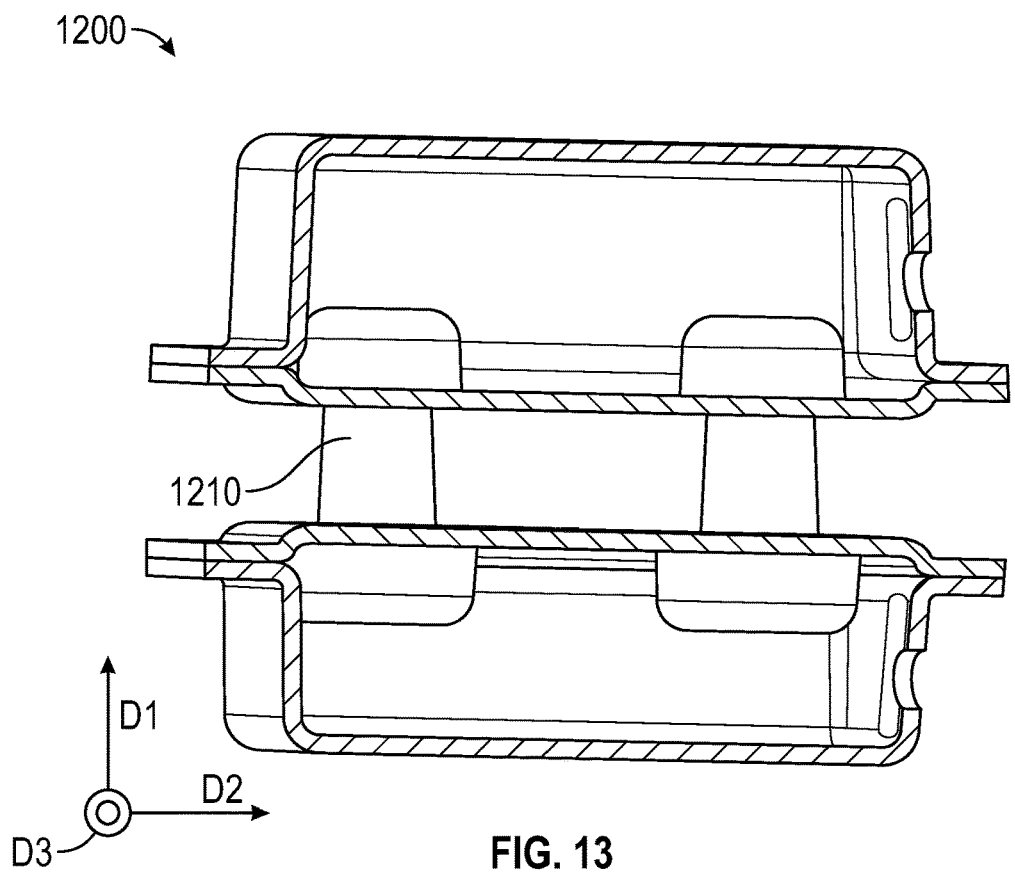
FIG. 13 is a cross-sectional view of an impact absorbing apparatus including embedded pillars between a first chamber and a second chamber according to an exemplary embodiment of the present disclosure.
Figure 14:
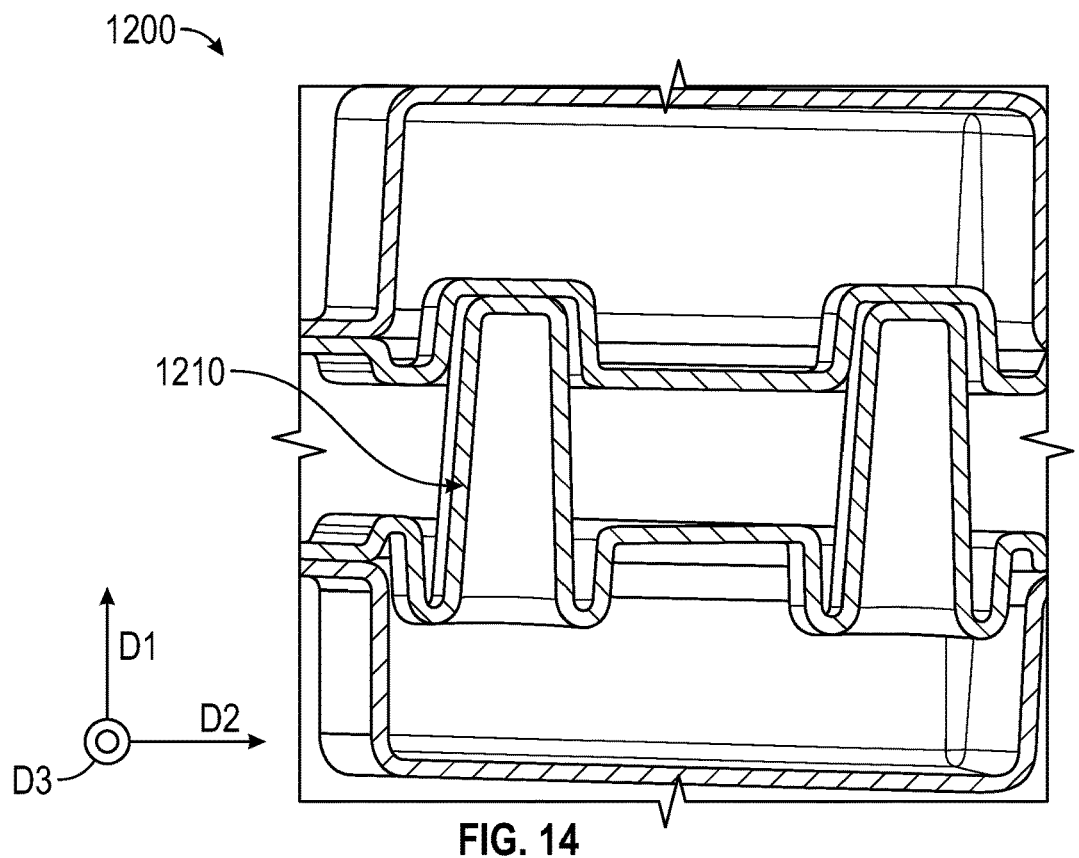
FIG. 14 is a cross-sectional view of an impact absorbing apparatus including other embedded pillars between a first chamber and a second chamber according to an exemplary embodiment of the present disclosure.
Figure 15:
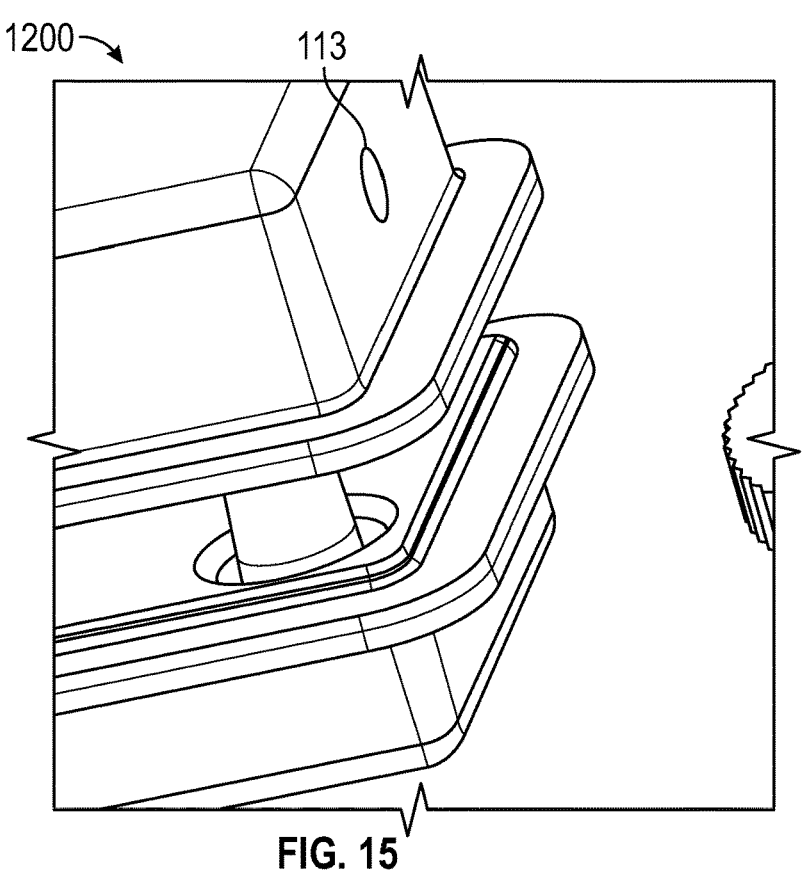
FIG. 15 is an enlarged exterior view of the impact absorbing apparatus of FIG. 14.

Referring to FIG. 11, impact absorbing apparatus 1100 includes a plurality of connecting pillars 1110. A stabilization disk 1101 is arranged between the first chamber and the second chamber. The stabilization disk connects the plurality of connecting pillars 1110 to each other.

Referring to FIGS. 12-15, impact absorbing apparatus 1200 includes a plurality of connecting pillars 1210 extend between the chamber ceiling of the first chamber and the chamber floor of the second chamber. The plurality of connecting pillars 1210 connect the first chamber to the second chamber. The plurality of connecting pillars 1210 are configured to shift position in response to a first impact, as described herein (e.g., to absorb a rotational impact between the first chamber and the second chamber). The plurality of connecting pillars 1210 each define a first end extending below the ceiling of the first chamber and a second end extending above the floor of the second chamber.

Figure 16:
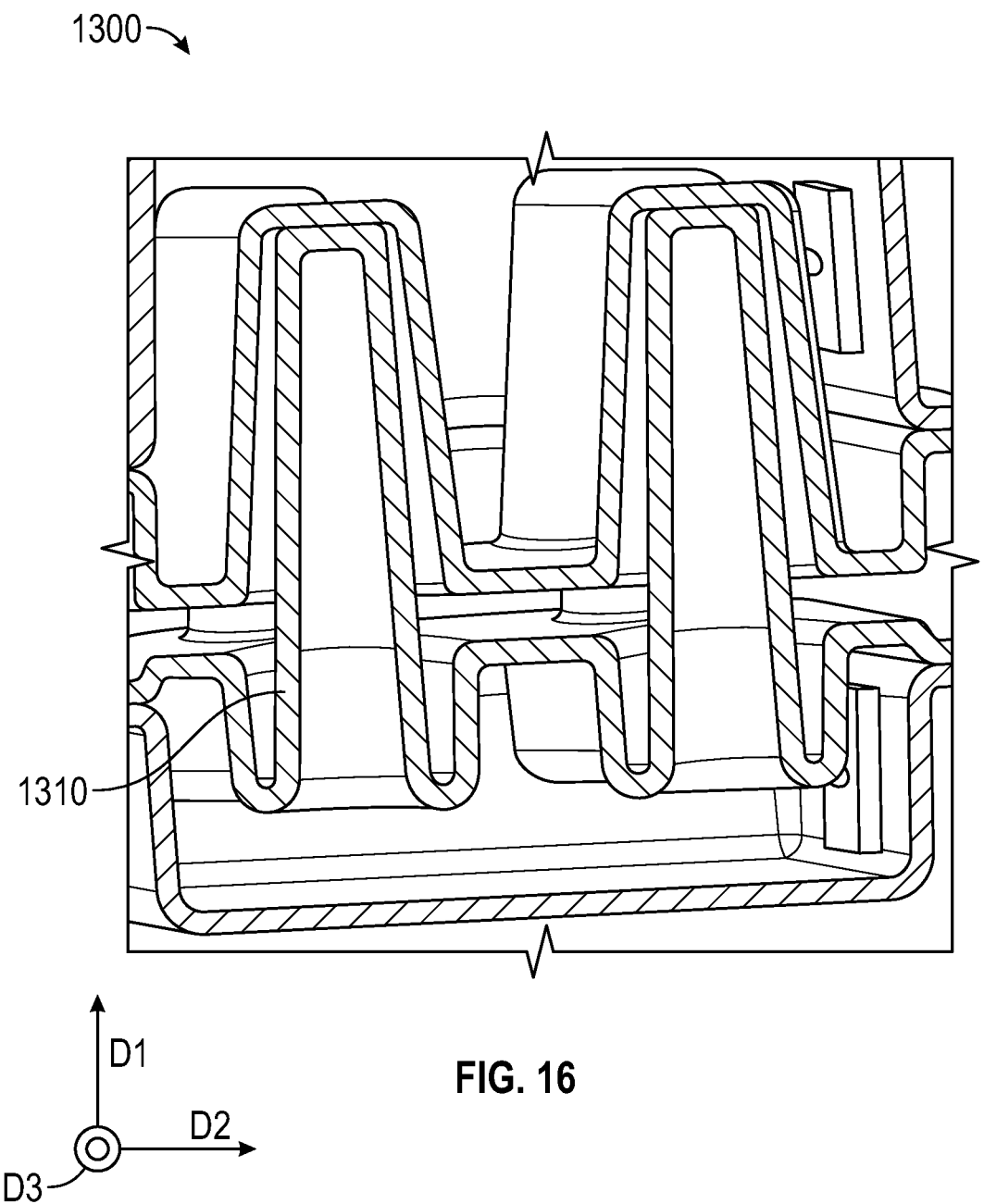
FIG. 16 is a cross-sectional view of an impact absorbing apparatus including other embedded pillars between a first chamber and a second chamber according to an exemplary embodiment of the present disclosure.
Figure 17:
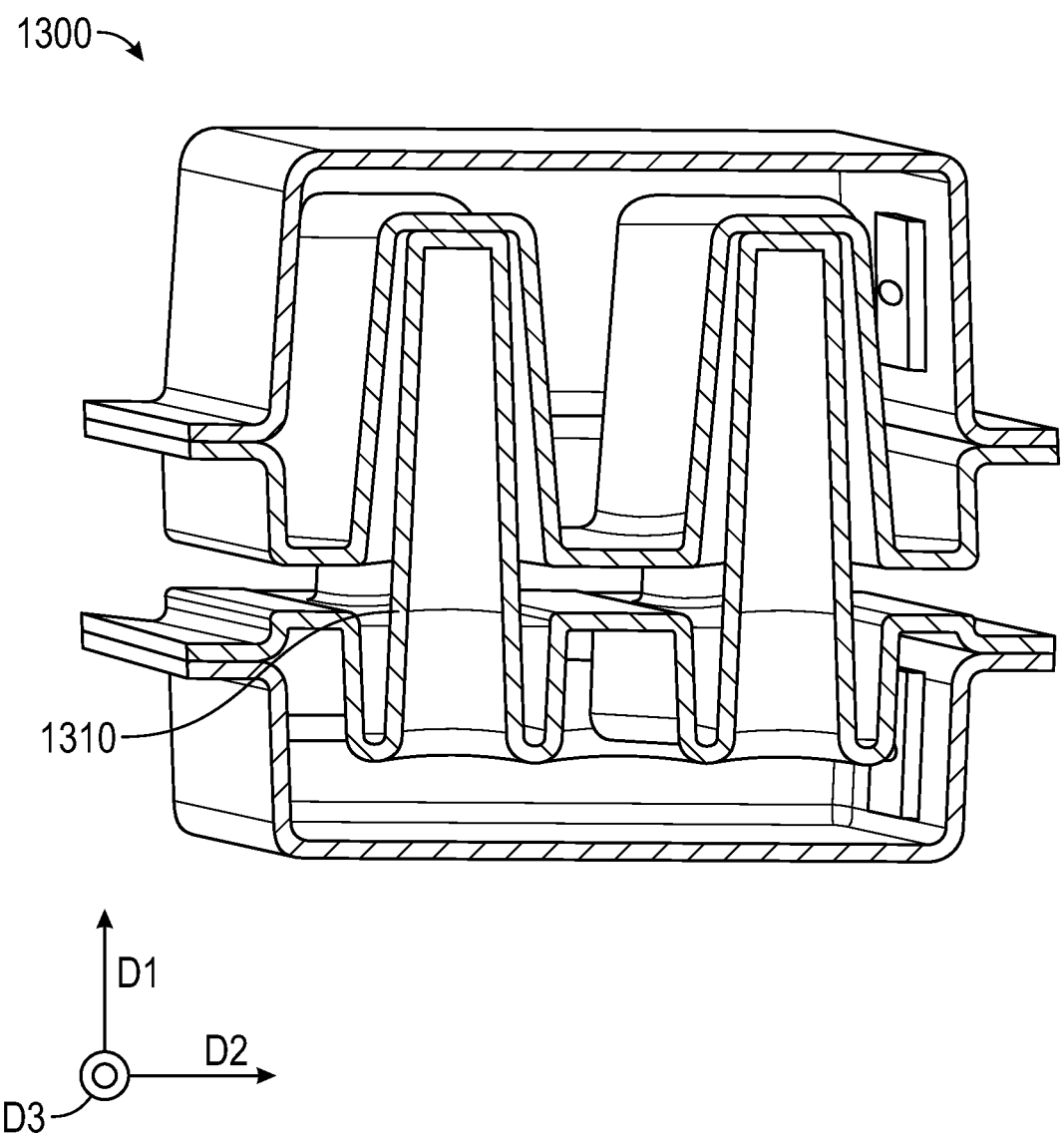
FIG. 17 is an expanded cross-sectional view of the impact absorbing apparatus of FIG. 16.

Referring to FIGS. 16-17, impact absorbing apparatus 1300 includes connecting pillars 1310. The inner space of the first chamber has a different volume from a volume of the inner space of the second chamber. The first end of each of the plurality of connecting pillars 1310 extends into the first chamber a different distance than the second end of each of the plurality of connecting pillars 1310 extends into the second chamber.

The plurality of connecting pillars 1310 may each have a tapered configuration along a direction extending between the first chamber and the second chamber.

Figure 18:
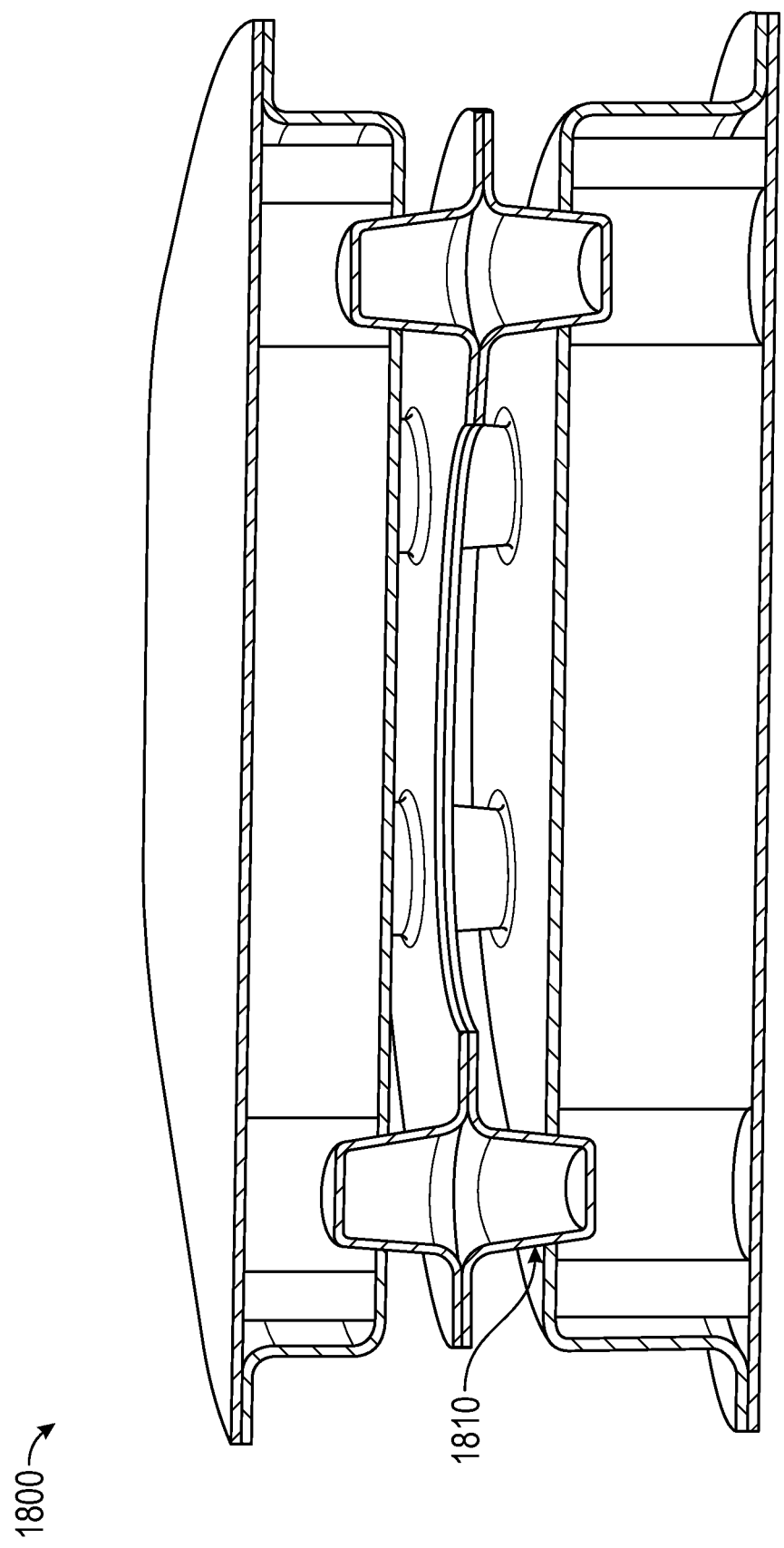
FIG. 18 is a cross-sectional view of another impact absorbing apparatus according to an exemplary embodiment of the present disclosure.

Referring to FIG. 18, impact absorbing apparatus 1800 includes connecting pillars 1810. The plurality of connecting pillars 1810 each define a first end portion, a second end portion and a central portion between the first end portion and the second end portion. The central portion defines a wider width than a width of the first end portion or the second end portion.

Figure 19:
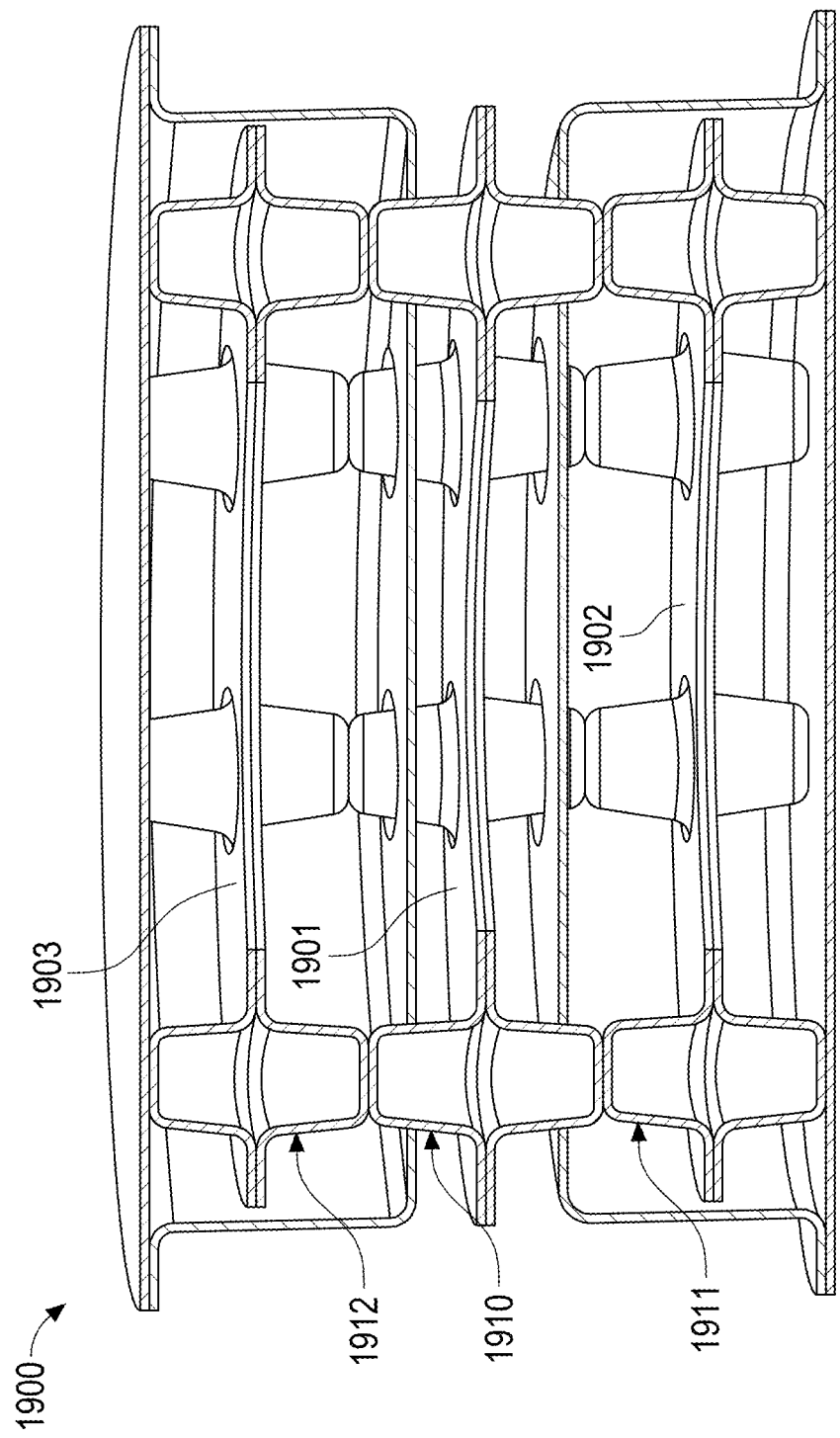
FIG. 19 is a cross-sectional view of another impact absorbing apparatus including stacked pillars according to an exemplary embodiment of the present disclosure.

Referring to FIG. 19, impact absorbing apparatus 1900 includes pillars 1910, 1910a, 1911 and 1912. Second plurality of connecting pillars 1911 are arranged in the first inner space of the first chamber and a third plurality of connecting pillars 1912 are arranged in the second inner space of the second chamber. The third plurality of connecting pillar 1912 are stacked on the plurality of connecting pillars 1910 and 1910a. The plurality of connecting pillars 1910 and 1910a are stacked on the second plurality of connecting pillars 1911. A first stabilization disk 1901 connects the plurality of connecting pillars to each other between the first chamber and the second chamber. Connecting pillars 1910a formed in a central region of the first stabilization disk 1901 may define a different shape from connecting pillars 1910. A second stabilization disk 1902 connects the second plurality of connecting pillars to each other in the first inner space of the first chamber. A third stabilization disk 1903 connects the third plurality of connecting pillars to each other in the second inner space of the second chamber.

FIGS. 20-23 illustrate, for example, exemplary arrangements of pillars according to embodiments of the present disclosure.

Figure 20:
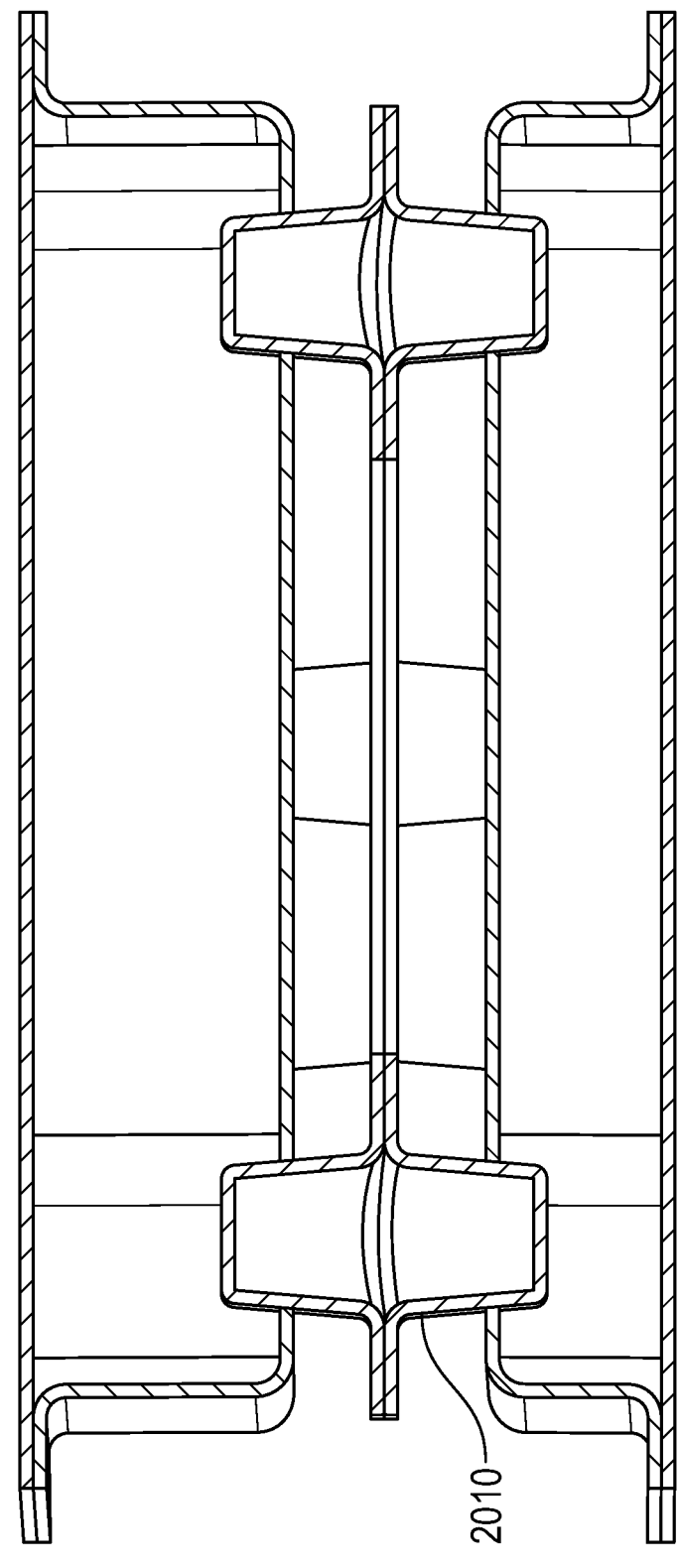
FIG. 20 is a cross-sectional view of another impact absorbing apparatus according to an exemplary embodiment of the present disclosure.

Referring to FIG. 20, impact absorbing apparatus 2000 includes pillars 2010 connected with each other by a stabilization disk and arranged spaced part from each other around a perimeter of impact absorbing apparatus 2000.

Figure 21:
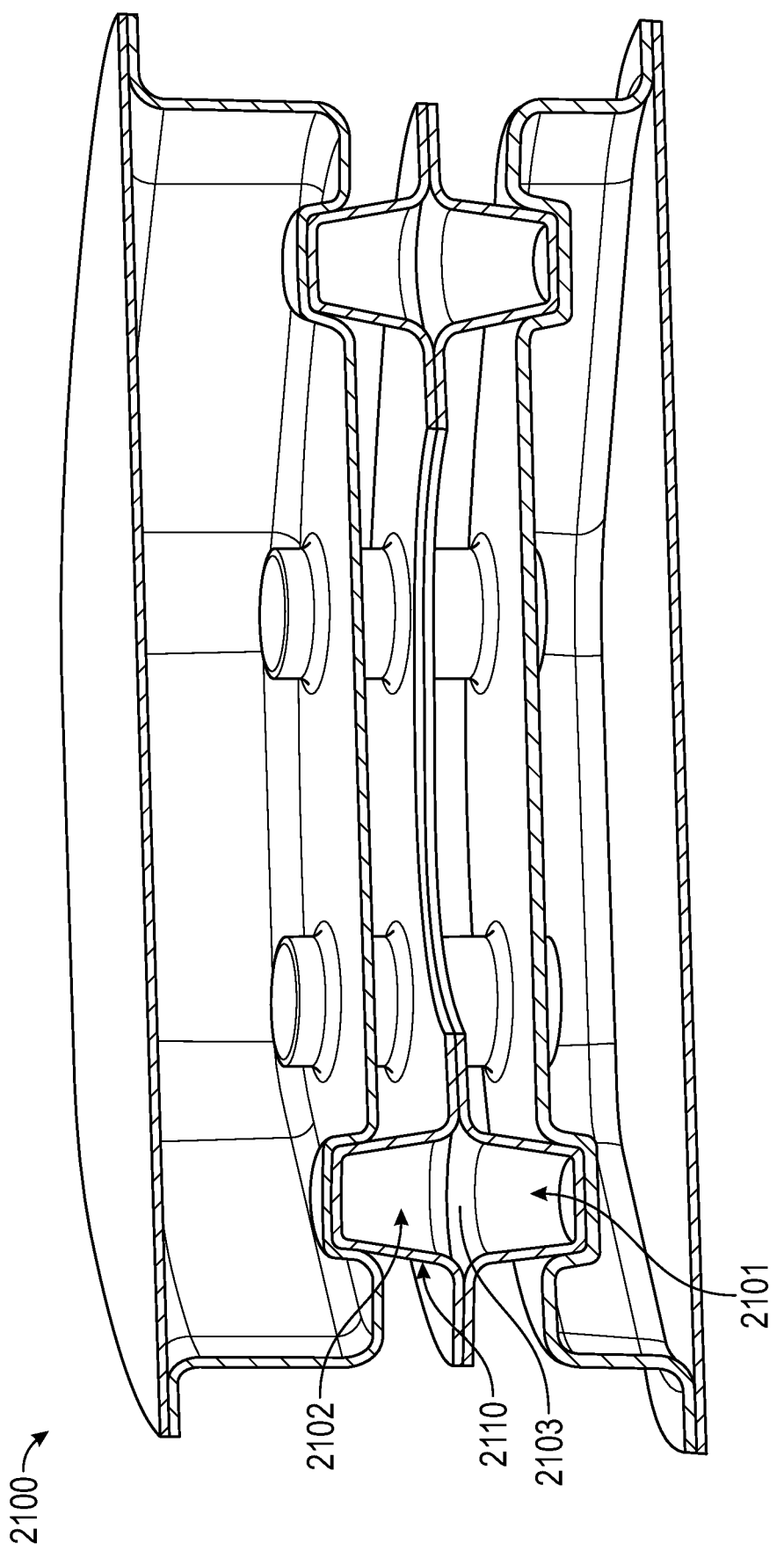
FIG. 21 is a cross-sectional view of another impact absorbing apparatus according to an exemplary embodiment of the present disclosure.

Referring particularly to FIG. 21, impact absorbing apparatus 2100 includes connecting pillars 2110. Each of the plurality of connecting pillars 2110 defines a third inner space 2101 and a fourth inner space 2102. The third inner space 2101 and the fourth inner space 2102 are each fluidly isolated from the first inner space of the first chamber and the second inner space of the second chamber. A wall 1203 separates the third inner space 2101 and the fourth inner space 2102 from each other.

Figure 22:
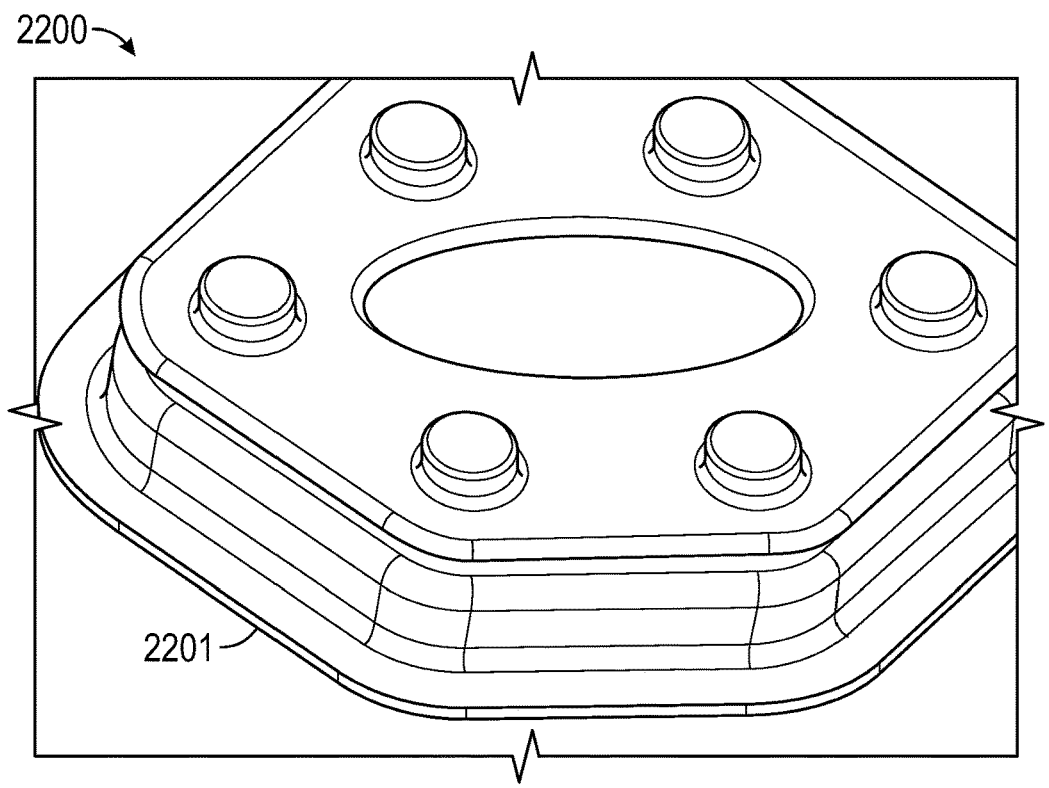
FIG. 22 illustrates an exemplary arrangement of support pillars of a stackable chamber according to an exemplary embodiment of the present disclosure.
Figure 23:
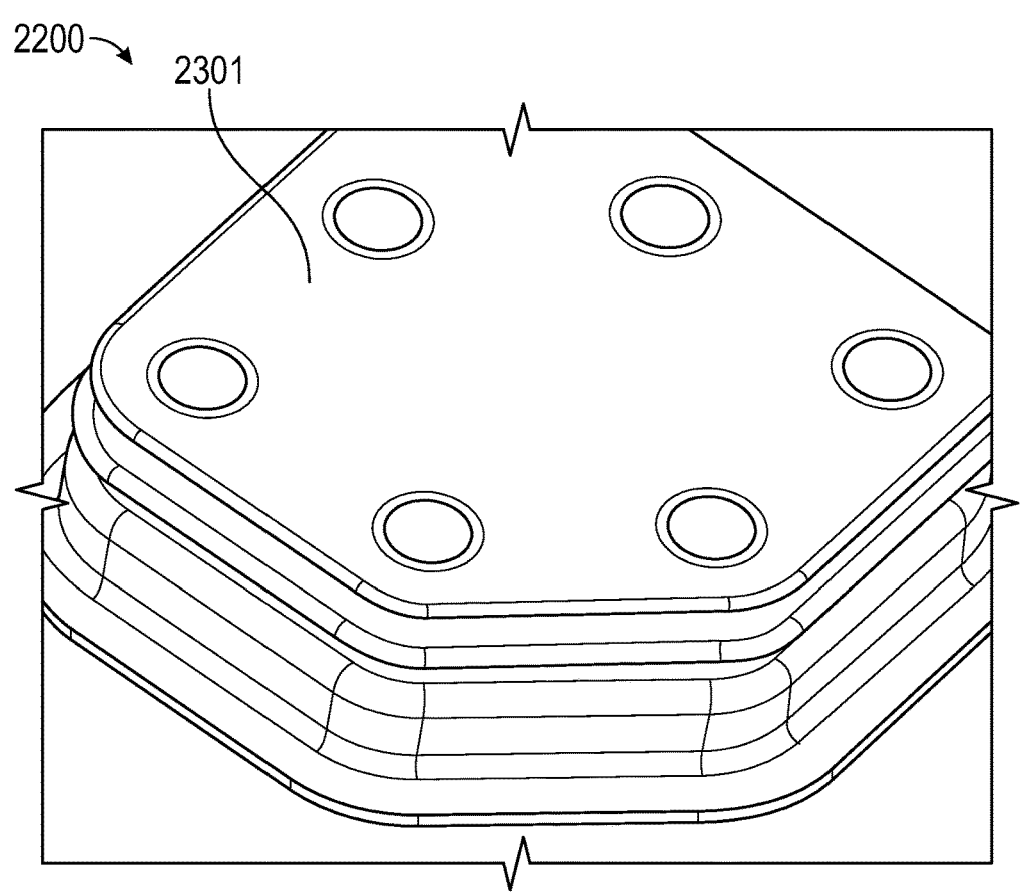
FIG. 23 illustrates an impact absorbing pad arranged on a stackable chamber of an impact absorbing apparatus according to an exemplary embodiment of the present disclosure.

Referring to FIGS. 22 and 23, impact absorbing apparatus 2200 includes a chamber 2201 with a stabilization plate 2301. The stabilization plate 2301 can be employed to secure an arrangement of pillars extending from the chamber 2201.

Having described exemplary embodiments of the present disclosure, it is further noted that it is readily apparent to those of ordinary skill in the art that various modifications may be made without departing from the spirit and scope of the present disclosure.

What is claimed is:
1. An impact absorbing apparatus, comprising:
a first chamber including a first inner space, a first chamber wall and a first valve disposed in the first chamber wall, the first chamber defining a chamber ceiling;

a second chamber including a second inner space, a second chamber wall and a second valve disposed in the second chamber wall, the second chamber defining a chamber floor, the chamber floor of the second chamber facing the chamber ceiling of the first chamber;

a plurality of connecting pillars extending between the chamber ceiling of the first chamber and the chamber floor of the second chamber, the plurality of connecting pillars connecting the first chamber to the second chamber, the plurality of connecting pillars configured to shift position in response to a first impact, wherein the connecting pillars of the plurality of connecting pillars are fluidly isolated from the first chamber or the second chamber, wherein the connecting pillars of the plurality of connecting pillars each define a single chamber therein, wherein the single chamber is fluidly isolated from an outside atmosphere, wherein at least one connecting pillar of the plurality of connecting pillars defines a side surface directly exposed to the outside atmosphere, wherein the side surface of the at least one connecting pillar exposed to the outside atmosphere extends above the chamber floor of the second chamber into the second inner space and extends below the chamber ceiling of the first chambers into the first inner space of the first chamber, wherein the first valve is configured to pass air out of the first inner space of the first chamber in response to a second impact, wherein the second valve is configured to pass air out of the second inner space of the second chamber in response to a third impact, wherein the plurality of connecting pillars each define a first end extending below the ceiling of the first chamber and a second end extending above the floor of the second chamber, wherein the first valve includes a plurality of first valve leaflets defining a first aperture configured to expand between a first diameter in which air is passed out of the first inner space in response to the first impact and a second diameter larger than the first diameter to refill the first inner space with air after the second impact, wherein the first valve leaflets of the plurality of first valve leaflets extend from the first chamber wall of the first chamber, and wherein the second valve includes a plurality of second valve leaflets defining a second aperture configured to expand between a third diameter in which air is passed out of the second inner space in response to the second impact and a fourth diameter larger than the third diameter to refill the second inner space with air after the second impact, wherein the second valve leaflets of the plurality of second valve leaflets extend from the second chamber wall of the second chamber.

2. The impact absorbing apparatus of claim 1, wherein the second impact is greater than the first impact, and wherein the third impact is greater than the second impact.

3. The impact absorbing apparatus of claim 1, further including at least one first chamber reinstating pillar disposed in the inner space of the first chamber, wherein the first chamber reinstating pillar is configured to apply a first force to return a compressed first chamber to its original shape.

4. The impact absorbing apparatus of claim 3, further comprising at least one second chamber reinstating pillar disposed in the inner space of the second chamber, wherein the second chamber reinstating pillar is configured to apply a second force to return a compressed second chamber to its original shape.

5. The impact absorbing apparatus of claim 4, wherein the first force is smaller than the second force.

6. The impact absorbing apparatus of claim 3, wherein the at least one first chamber reinstating pillar is further configured to at least partially compress in response to the second impact to decrease an acceleration of the second impact.

7. The impact absorbing apparatus of claim 4, wherein the at least one second chamber reinstating pillar is further configured to at least partially compress in response to the third impact to decrease an acceleration of the second impact.

8. The impact absorbing apparatus of claim 4, wherein at least one second chamber reinstating pillar is stacked on at least one connecting pillar, and wherein the at least one connecting pillar is stacked on at least one first chamber reinstating pillar.

9. The impact absorbing apparatus of claim 4, further including at least one impact absorbing pad arranged between the first chamber and the second chamber.

10. The impact absorbing apparatus of claim 1, further including a stabilization disk arranged between the first chamber and the second chamber, the stabilization disk connecting the plurality of connecting pillars to each other.

11. The impact absorbing apparatus of claim 1, wherein the first inner space of the first chamber extends to a first inner space of a first connecting pillar of the plurality of connecting pillars, and wherein the second inner space of the second chamber extends to a second inner space of the first connecting pillar of the plurality of connecting pillars.

12. The impact absorbing apparatus of claim 1, wherein the inner space of the first chamber has a different volume from a volume of the inner space of the second chamber, and wherein the first end of each of the plurality of connecting pillars extends into the first chamber a different distance than the second end of each of the plurality of connecting pillars extends into the second chamber.

13. The impact absorbing apparatus of claim 1, further including a second plurality of connecting pillars arranged in the first inner space of the first chamber and a third plurality of connecting pillars arranged in the second inner space of the second chamber.

14. The impact absorbing apparatus of claim 13, wherein the third plurality of connecting pillar are stacked on the plurality of connecting pillars, and wherein the plurality of connecting pillars are stacked on the second plurality of connecting pillars.

15. The impact absorbing apparatus of claim 14, further including a first stabilization disk connecting the plurality of connecting pillars to each other between the first chamber and the second chamber.

16. The impact absorbing apparatus of claim 15, further including a second stabilization disk connecting the second plurality of connecting pillars to each other in the first inner space of the first chamber, and a third stabilization disk connecting the third plurality of connecting pillars to each other in the second inner space of the second chamber.

17. The impact absorbing apparatus of claim 1, wherein the plurality of connecting pillars each have a tapered configuration along a direction extending between the first chamber and the second chamber.

18. The impact absorbing apparatus of claim 1, wherein the plurality of connecting pillars each define a first end portion, a second end portion and a central portion between the first end portion and the second end portion, wherein the central portion defines a wider width than a width of the first end portion or the second end portion.

19. The impact absorbing apparatus of claim 1, wherein a sidewall of at least one first valve leaflet of the plurality of first valve leaflets is configured to directly contact a sidewall of at least one other first valve leaflet of the plurality of first valve leaflets adjacent the at least one first valve leaflet of the plurality of first valve leaflets.

* * * * *